Figure 1:
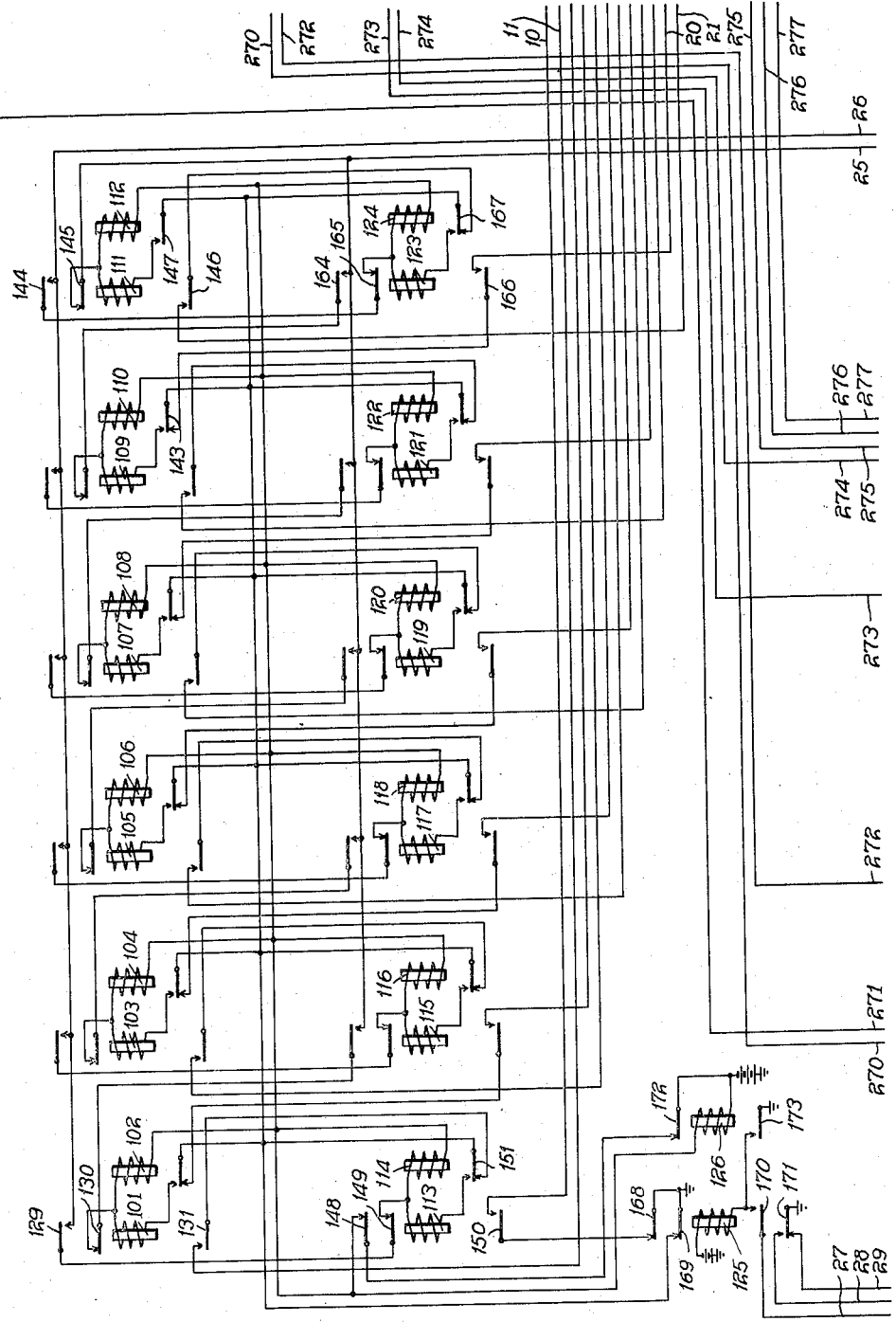

Patented Aug. 27, 1929.

1,726,131

UNITED STATES PATENT OFFICE.

ROY J. WENSLEY, OF EDGEWOOD, AND THOMAS U. WHITE, OF PITTSBURGH, PENNSYLVANIA, ASSIGNORS TO WESTINGHOUSE ELECTRIC & MANUFACTURING COMPANY, A CORPORATION OF PENNSYLVANIA.

ELECTRICAL CONTROL SYSTEM.

Application filed May 15, 1924. Serial No. 713,434.

Our invention relates, in general, to electrical control system and more particularly to apparatus for supervising and controlling, from a central point, remotely-disposed electrical equipment.

One object of our invention is to provide improved circuit arrangements whereby it is possible for a dispatcher at a central point to supervise and control remotely-disposed electrical equipment by the operation of synchronously-operating relay chains.

Another object of our invention is to provide means whereby it is possible for the dispatcher to ascertain the selecting position of the relay chains during their selecting operations.

Another object of our invention is to provide means whereby the dispatcher may ascertain the reading of meters at the remotely-disposed station or substation at his option.

Another object of our invention is to provide means for accomplishing the above results, regardless of the character of the metering device at the station, that is, whether it is an ammeter, wattmeter, voltmeter, etc.

Another object of our invention is to provide means whereby the dispatcher is enabled to ascertain the readings such as amperes, volts, watts or any other reading such as a synchroscope reading of two feeder circuits at the station simultaneously, or the reading of the current and the voltage on one feeder circuit simultaneously.

Another object of our invention is to provide means whereby the dispatcher is enabled to selectively ascertain the electrical conditions of any one of a plurality of feeders.

Another object of our invention is to provide a number of common metering devices which may be selectively connected under the control of the dispatcher to any one of a number of feeders at the station.

Another object of our invention is to provide a number of common receiving means at the dispatcher's office which may be selectively associated with any predetermined feeder at the station.

Another object of our invention is to provide means for operating a synchronoscope at the dispatcher's office from the station.

A still further object of our invention is to provide means whereby the dispatcher may ascertain when the alternating voltages in two feeder circuits are in phase or the generators supplying these feeders are synchronized and to provide means whereby the feeders may be connected at the instant that the machines are in synchronism.

There are other objects of the invention which, together with the foregoing, will be described in the detailed specification which is to follow.

Referring now to the drawings, comprising Figures 1 to 10, inclusive, we have shown, by means of conventional diagrams, the apparatus and circuits for carrying out our invention.

The apparatus and circuits shown in Figs. 1 to 4, inclusive, are those located at the central station or dispatcher's office, while the apparatus and circuits shown in Figs. 5 to 10, inclusive, are those located at the distant station or substation.

In practicing our invention, we provide a chain of counting relays at the dispatcher's office and a chain of counting relays, corresponding in number, at the substation in which are located the apparatus units that it is desired to control and supervise. There are two groups of selecting relays associated with each group of counting relays, although the number of groups of selecting relays may be increased in order to increase the capacity of the system. In addition, switching relays are provided, one for each group of selecting relays.

A control circuit is located at both the dispatcher's office and station for controlling the operation of the counting relays. The counting relay chains and control circuit are connected by means of a four-conductor trunk line, three conductors being shown and the ground return utilized.

In the dispatcher's office, a group of keys are provided corresponding in number to the number of apparatus units that it is desired to control. A common starting key is also located at the office. There are a number of other keys which are provided for the purpose of enabling the dispatcher to connect with a particular apparatus unit or feeder at the substation and remain in connection therewith as long as he desires.

There is one of these keys for each apparatus unit or feeder with which it is desired to connect.

A signalling lamp is associated with each selecting relay at the dispatcher's office in order to apprise the dispatcher of the position of the selecting apparatus. Three metering devices are also provided, namely, a voltmeter, an ammeter and a wattmeter, to indicate the electrical characteristics of any predetermined feeder at the station. In addition, a synchronoscope is provided at the dispatcher's office for informing the dispatcher when the alternating voltages in two feeder circuits are in phase or the generators supplying these circuits are in synchronism. Two signalling lamps are provided for each apparatus unit that it is desired to supervise.

At the substation, in addition to the apparatus mentioned, there are provided three meters together with the associated apparatus for transmitting the reading of the electrical characteristics of any feeder, such, for example, as the electromotive force, current and power. It will, of course, be obvious that other meters may be provided for sending other desired electrical characteristics of the feeders. These meters are associated with any one of a number of feeders by the operation of the selecting relays at the substation in a manner that will be apparent.

The operation of the apparatus will now be briefly described. It will be assumed that the dispatcher desires to ascertain the voltage across one phase of a feeder at the substation. To accomplish this result, the dispatcher will operate one of the keys at the office that is associated with the selecting relay that corresponds to the selecting relay at the substation that selects the feeder desired. The dispatcher will then operate the start key.

As a result of this operation, certain control circuits function to operate the relays in the counting chains at the office and station in a predetermined sequence. The control circuits are operated by the alternate application of current from two separate batteries. Checking means are provided in order that, unless the two batteries are connected to the control circuit alternately, the apparatus does not function.

Simultaneously with the first cycle of the counting relay chains, a switching relay is operated at both the dispatcher's office and substation to connect the relays of the auxiliary selecting groups and these relays are operated in a predetermined sequence under the control of the counting relays. As the selecting relays operate, circuits are prepared for associating the metering apparatus with the feeder circuits. In other cases, signalling circuits are prepared for operating the selected apparatus units.

As the dispatcher does not desire to control any apparatus unit at the substation, no controlling operation is performed and the control and signalling apparatus is not operated. The control circuit continues to function. If the desired feeder is not selected by the operation of the selecting relays in the first group, the counting chains will be reoperated, the previously-mentioned switching relays will be released and another switching relay at the dispatcher's office and substation will be operated to connect the relays of the second auxiliary selecting groups under the control of the counting relays. When the proper feeder is selected, the control circuit ceases to function and, by reason of the operation of the proper selecting relay, the meter that is adapted to transmit electromotive force readings is connected across the phase that has been selected. This meter is now operated in accordance with the voltage in this phase.

At the dispatcher's office, by the operation of the selecting relay thereat, the voltmeter is connected to the signalling conductors extending between the station and the dispatcher's office. The operation of the voltmeter at the substation causes current to traverse the signalling conductors between the station and dispatcher's office in accordance with the voltage in the phase of the selected feeder. The voltmeter at the substation is operated to apprise the dispatcher of the voltage in this phase. The operation of the signalling lamp associated with the selecting relay apprises the dispatcher of the particular feeder and phase selected. When the dispatcher observes the voltage, he will restore the key associated with the selected phase and feeder to normal. As a result of this operation, the controlling circuit again starts to function. The transmitting apparatus at the station is restored to normal. After all the relays of the auxiliary selecting relay groups have been operated, the relay selecting apparatus is restored to normal.

The operation is substantially the same as that above described when it is desired to ascertain the voltage in any phase of any feeder circuit. The operation is also the same when it is desired to ascertain the current and power readings. Under certain conditions, it is possible to transmit two readings simultaneously, that is, current and voltage in one phase, current in two phases, etc. The operation under these conditions is the same as before, except that, by the operation of the selecting relays, two transmitting devices are operated and two indicating means are connected at the dispatcher's office to the signalling circuit.

The operation when the dispatcher desires to operate an apparatus unit in the substation, proceeds along the same general lines as before described. That is, by the operation of the selecting apparatus, the apparatus unit is selected. The control circuit momentarily ceases to function and a signalling circuit is closed for operating the selected apparatus unit.

As a result of the operation of the apparatus unit, another signalling circuit is completed from the substation for operating the signalling devices at the dispatcher's office to apprise the dispatcher of the operation of the selected apparatus unit. The operation of the signalling devices causes the control circuit to again start to function and the apparatus is restored to normal in the manner described.

When the dispatcher desires to connect two feeders at the station together, it is necessary that the alternating voltages be in phase, or, in other words, the generating machines that generate the current supplying the feeders should be in synchronism. In order to ascertain when these voltages are in phase, the dispatcher will operate the proper key at the office and will then operate the start key. As a result of this operation, the selecting apparatus again functions and the operation continues until the feeders have been selected in subtsantially the same manner as before. When the feeders have been selected, the operation of the control circuit ceases and the energization of the selecting relay connects two transformers, one of which is across one phase of one feeder and the other of which is across one phase of the other feeder.

By reason of the operation of the selecting apparaus at the dispatcher's office, a synchronoscope thereat is connected to the signalling conductors. When the two voltages are in phase, this will be indicated by the operation of the synchronoscope and the dispatcher will operate the control key associated with the particular apparatus unit that functions to connect the two feeders together and will release the key that corresponds to the two feeders. The apparatus unit at the substation is operated to connect the two feeders together and the signalling devices at the dispatcher's office associated with this apparatus unit are operated to apprise the dispatcher of the operation.

Referring now more particularly to Fig. 1, relays 101 to 124, inclusive, comprise the group or chain of counting relays at the dispatcher's office. Relays 125 and 126 are control relays for controlling certain releasing operations.

Figure 2:
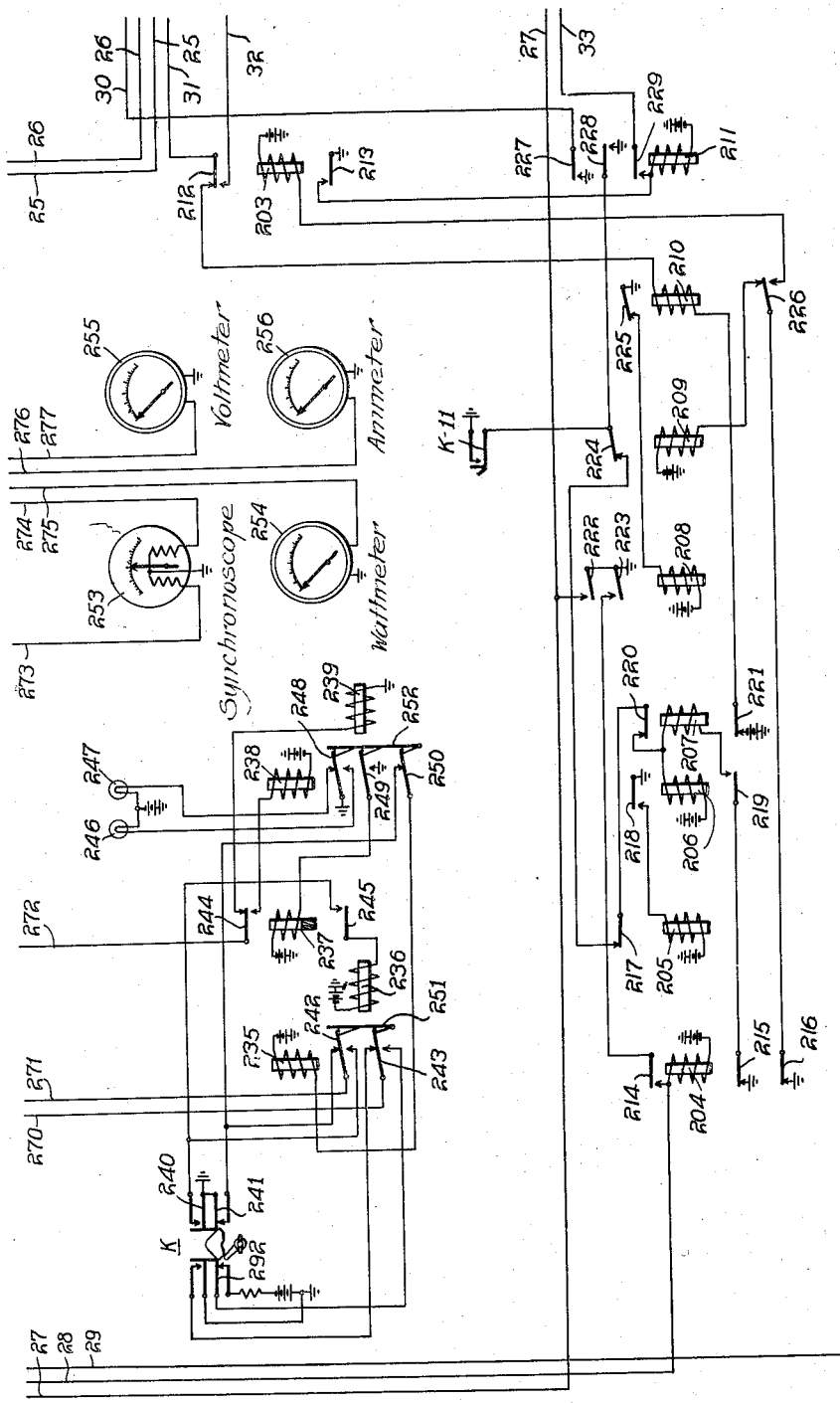

In Fig. 2, a key K is a twist type of a locking double-throw key. There is one such key for each apparatus unit that it is desired to control. Keys, such as K, are so constructed that, when operated, they lock in one of two positions. The key K has been shown in one position with the springs 292 and 241 engaging their resting contacts and the springs 291 and 240 out of engagement with their working contacts. When the key K is turned to its other position, the springs 292 and 241 are forced from engagement with their resting contacts and the springs 291 and 240 are forced into engagement with their working contacts. By this construction, it will be seen that it is impossible for the dispatcher to inadvertently operate a key by leaning on the control board or by the key catching in any part of his clothing.

Relays 235 to 239, inclusive, are associated with each key, such as K, and are provided for the purpose of controlling the operation of the control circuit and supervisory signalling devices 246 and 247 in a manner to be explained. The relays 235 and 236 are so constructed and positioned that the armatures 242 and 243 of the relay 235 are adapted to be held in operated position by the armature 251 of relay 236. The relays 238 and 239 are similarly constructed and positioned.

A synchronoscope, which is indicated diagrammatically at 253, is provided at the dispatcher's office. In addition, three metering instruments 254, 255 and 256 for indicating power, electromotive force and current, respectively, are provided. These instruments may be of any well known type that respond to changes in current flow though they are calibrated to indicate the characteristics mentioned. Relays 203 to 211, inclusive, comprise a portion of the control circuit at the dispatcher's office. A key K–11 is of the usual single-throw non-locking type and will be termed a "start" key.

Figure 3:
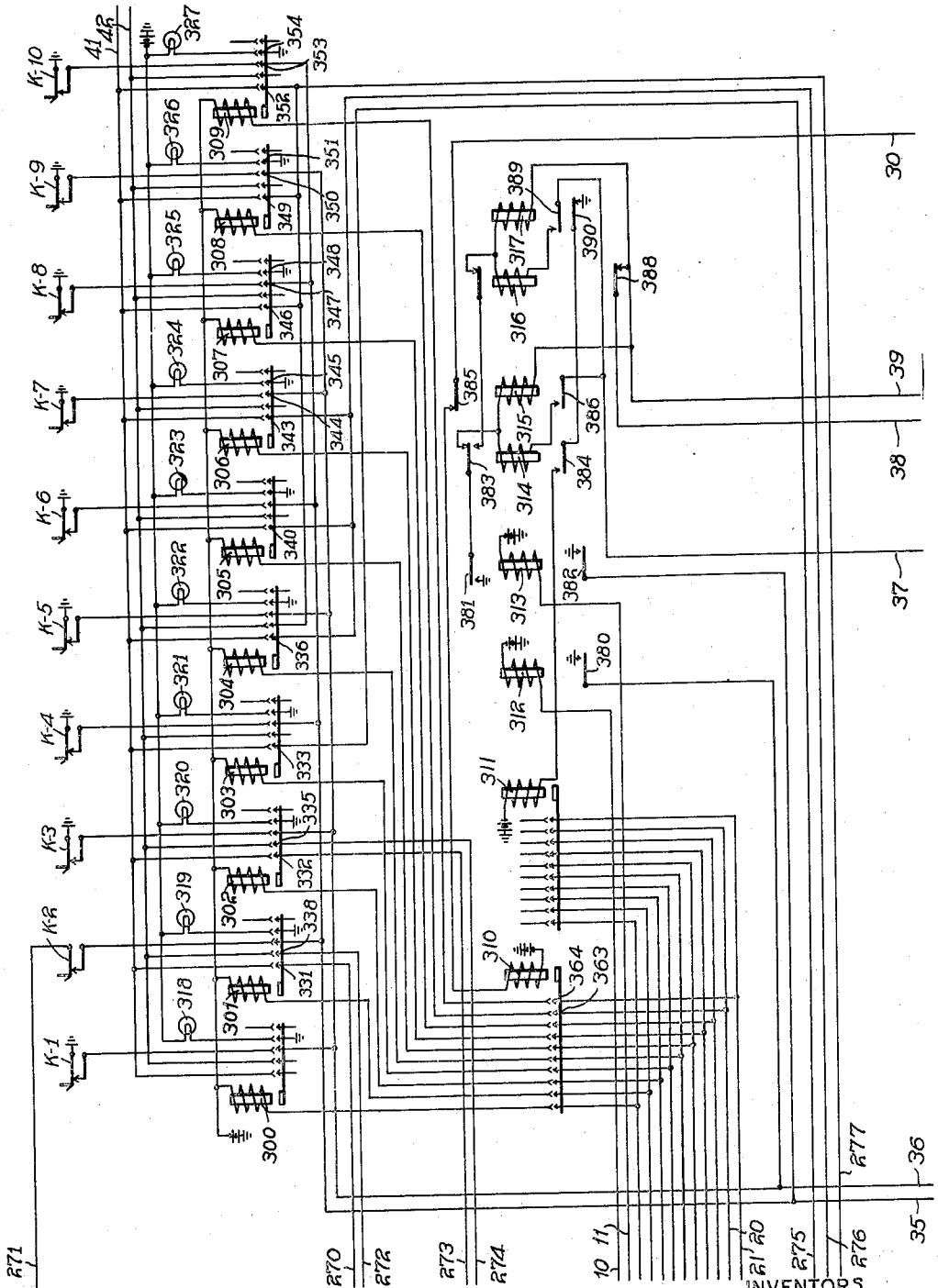
Figure 4:
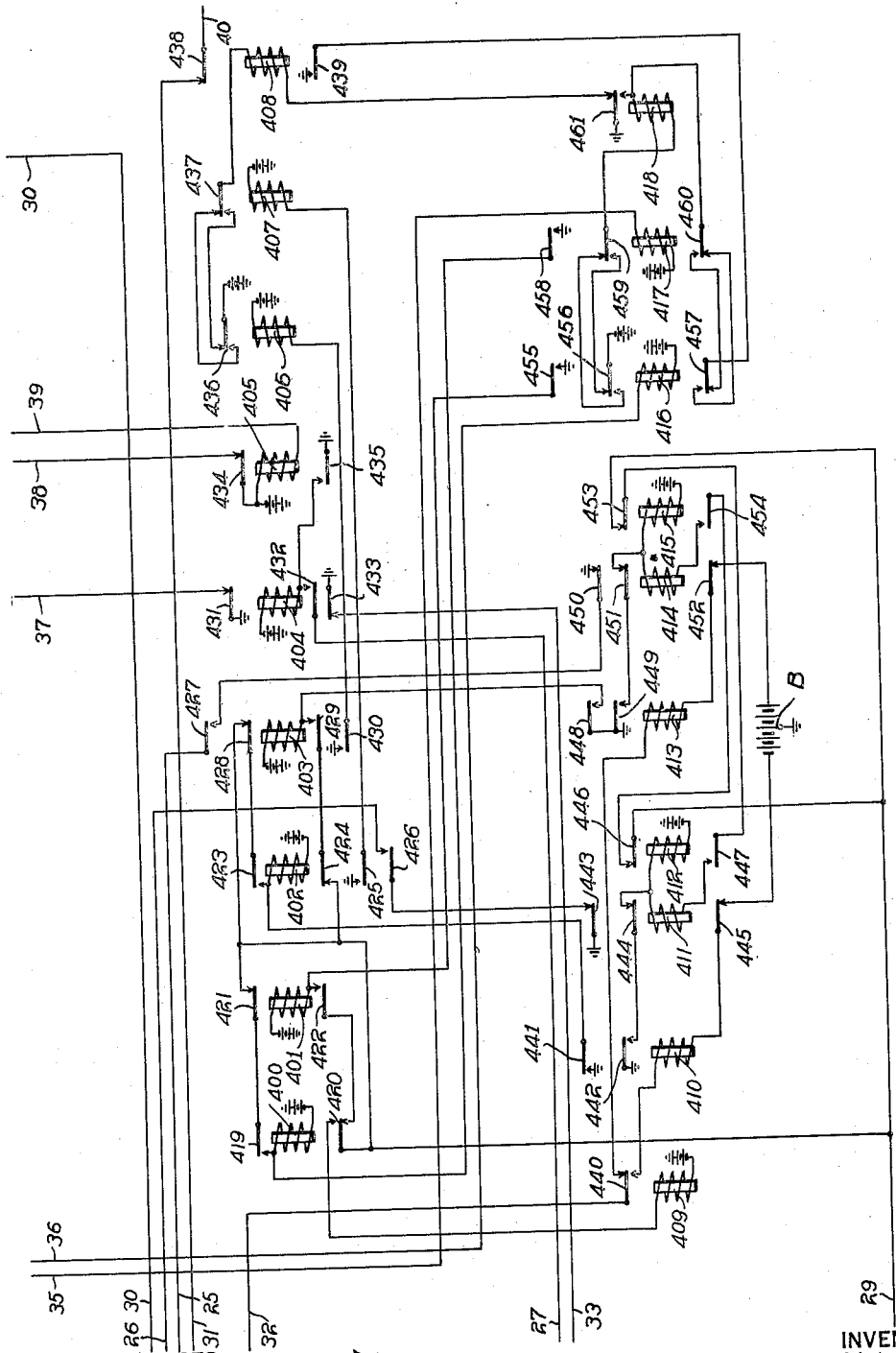

In Fig. 3, relays 300 to 309, inclusive, comprise the first group of selecting relays at the dispatcher's office. While these relays have been shown as multi-contact relays of a particular type, it is to be understood that any type of multi-contact relay may be used. Keys, such as K–1 to K–10, inclusive, are of the single-throw locking type and are provided for the purpose of selecting the feeder or apparatus unit that it is desired to connect with.

Signalling devices 318 to 327, inclusive, are ordinary signalling lamps. There is one such lamp for each selecting relay, such as 300 to 309, inclusive. Relays 310 and 311 are multi-contact relays. Relays 312 to 317, inclusive, comprise another portion of the control circuit at the dispatcher's office, while, in Fig. 4, relays 400 to 418, inclusive, comprise the remaining portion of the control circuit at the dispatcher's office.

Figure 5:
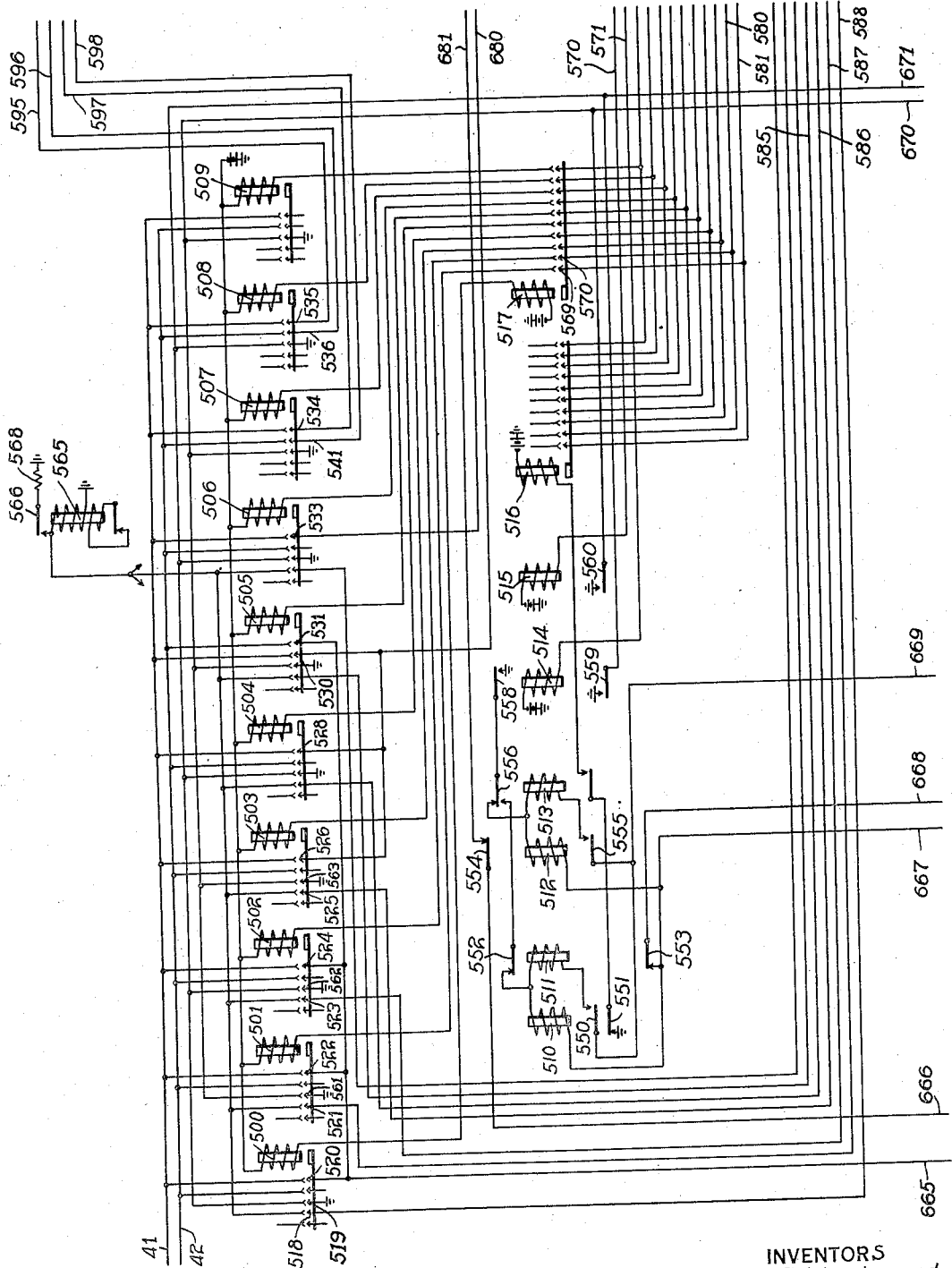

In Fig. 5, relays 500 to 509, inclusive, comprise the selecting relays of the first group at the substation. The relay 565 is a slow-to-operate relay and controls certain circuits in a manner to be described. Relays 516 and 517 are multi-contact switching relays and are provided for the purpose of associating the various groups of selecting relays with the relays of the counting chain at the substation. Relays 510 to 515, inclusive, comprise a portion of the control circuit at the substation.

Figure 6:
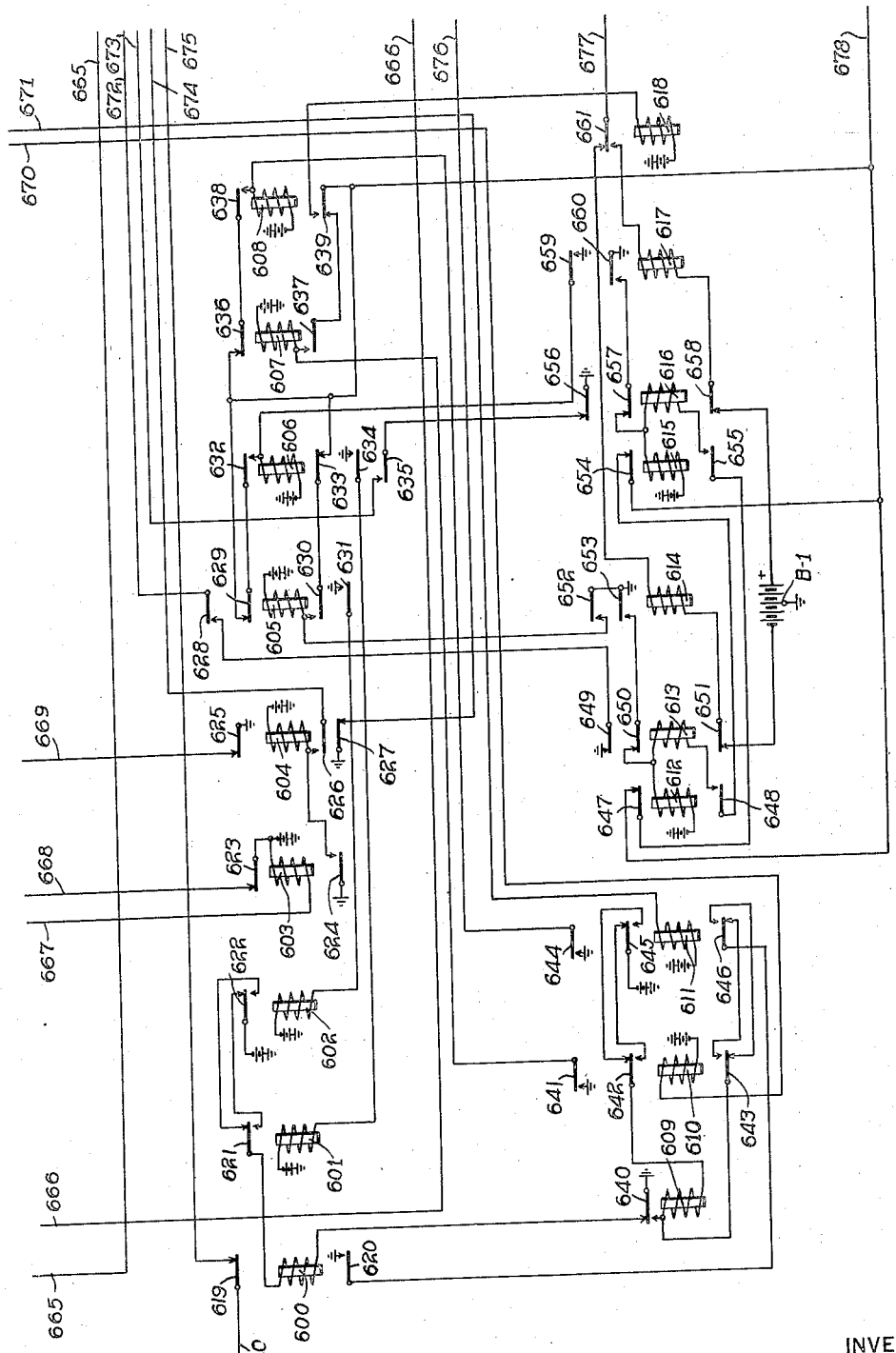

Relays 600 to 618, inclusive, Fig. 6, comprise another portion of the control circuit at the substation.

Figure 7:
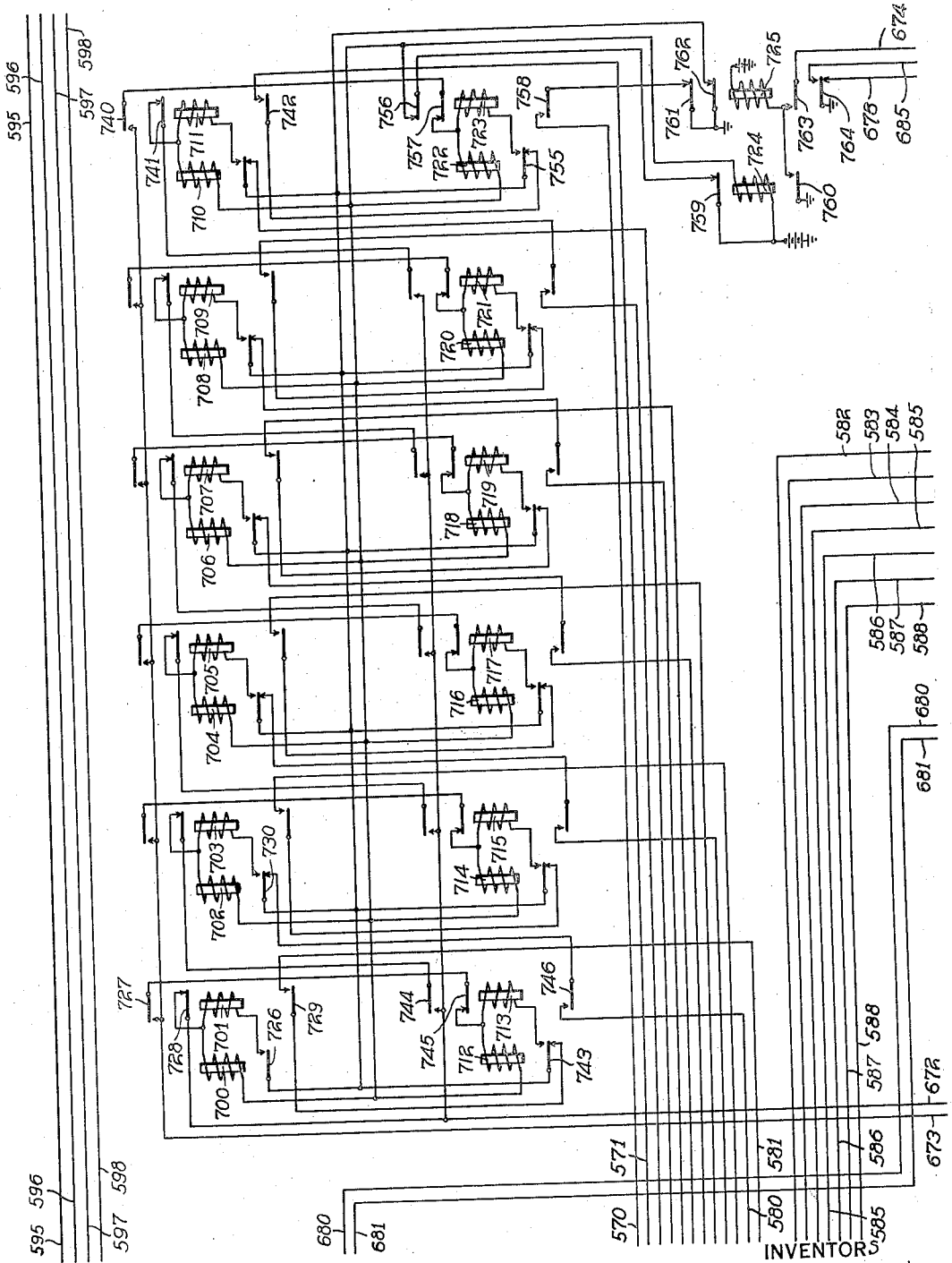
Figure 8:
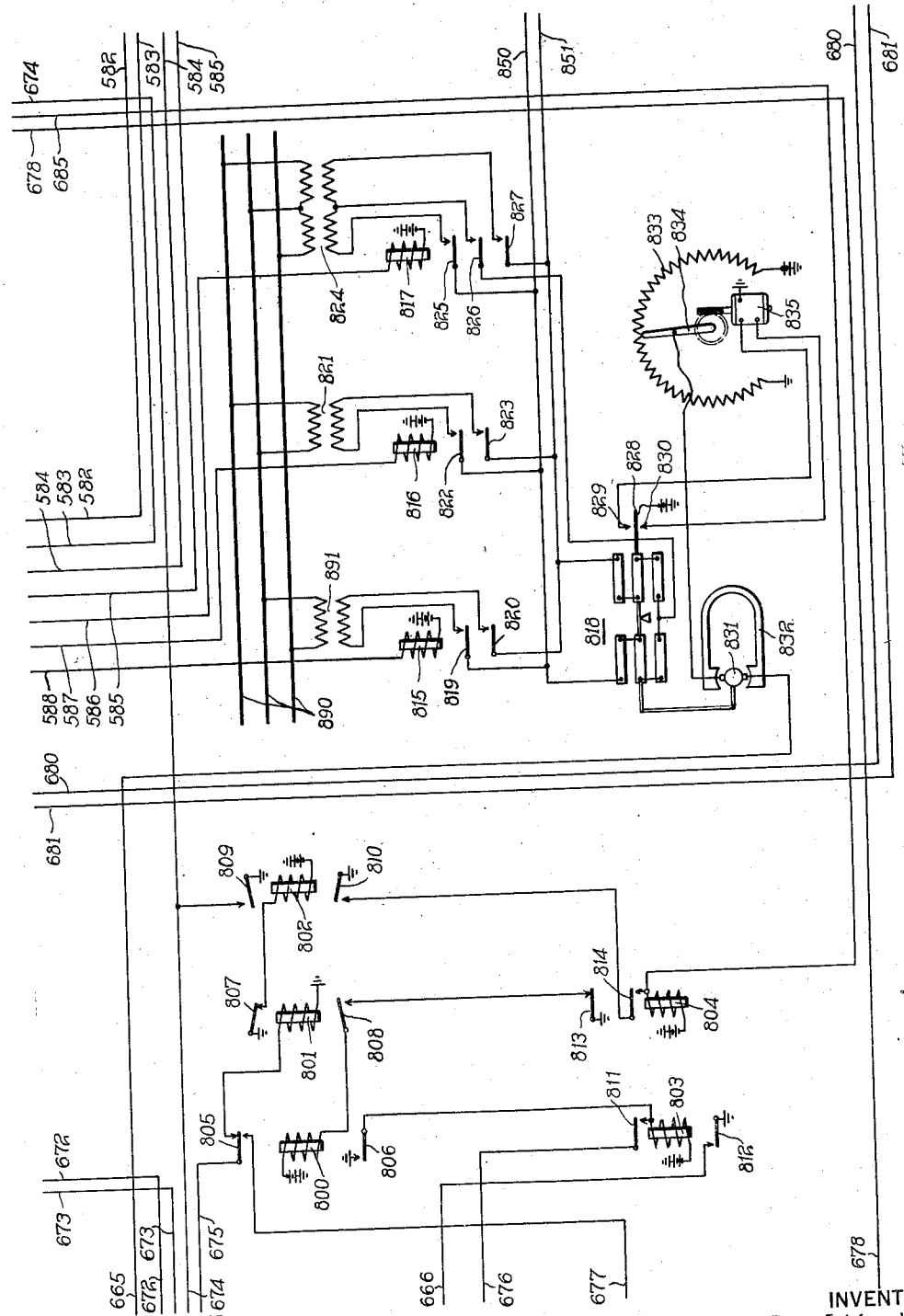

Relays 700 to 723, inclusive, Fig. 7, comprise the relays of the counting chain at the substation. Relays 724 and 725 are controlling relays for controlling certain releasing operations. Relays 800 to 804, inclusive, comprise the remaining portion of the control circuit at the substation.

Relays 815 to 817, inclusive, may be of any usual type of power relays, such as a contactor, and are provided for the purpose of connecting a metering device 818 to the three-phase power circuit 890. The metering device 818 comprises an ordinary Kelvin balance, the movable coils of which are controlled by a dynamometer type galvanometer. The Kelvin balance controls the operation of the motor 835 that is adapted to rotate a contact-making arm 834 over a resistor 833. All this metering apparatus comprises the measuring and transmitting devices that are provided for the purpose of transmitting the meter indication or reading to the dispatcher's office. For a more complete description of the mechanical and electrical details of this unit, reference is made to the copending application Serial No. 684,063 of Raymond T. Pierce, filed January 2, 1924, Patent No. 1,687,692, issued Oct. 16, 1928.

Figure 9:
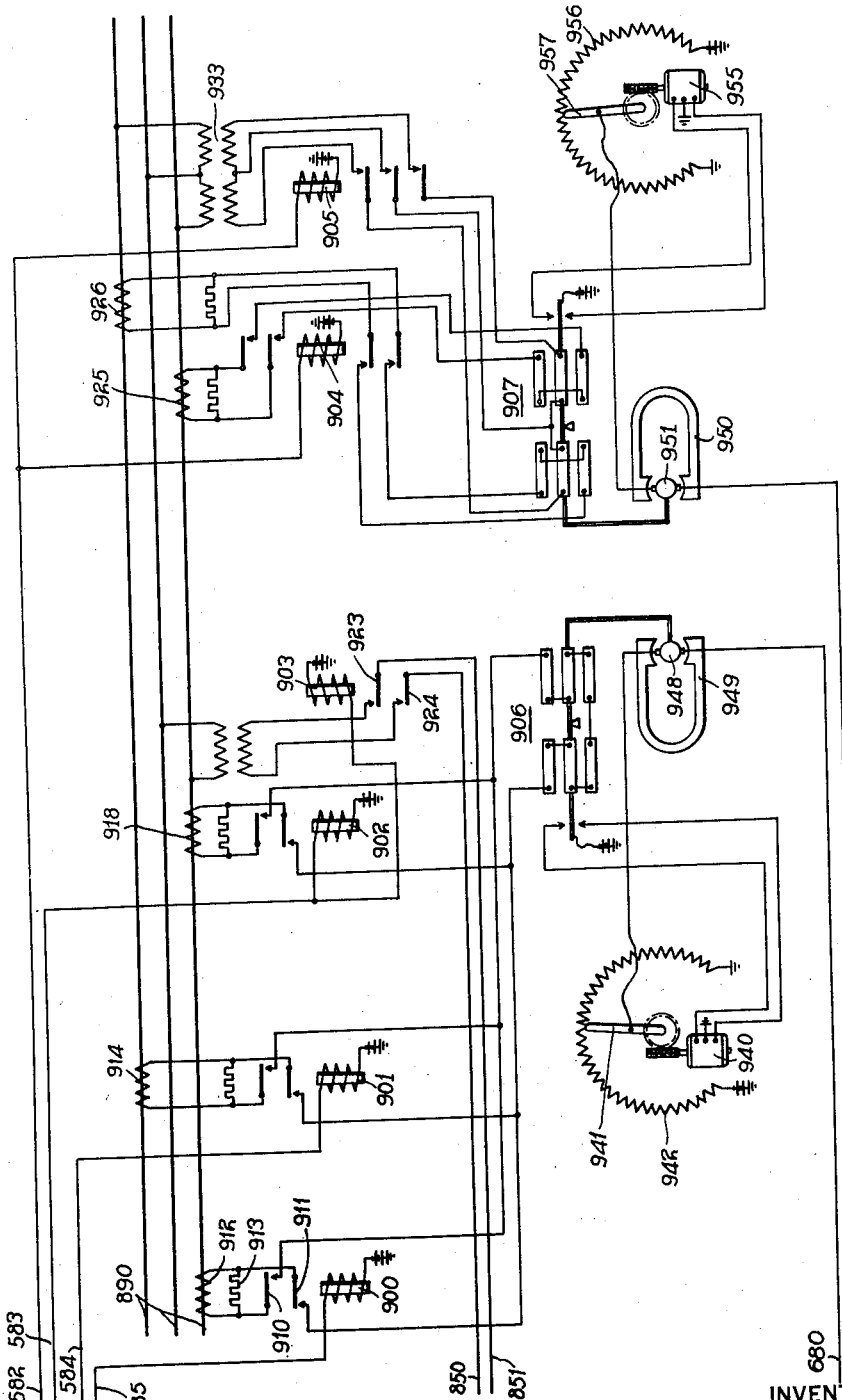

In Fig. 9, relays 900 to 905, inclusive, are power relays similar in construction to the relay 815. The metering devices 906 and 907 are similar to the device 818 previously described.

Figure 10:
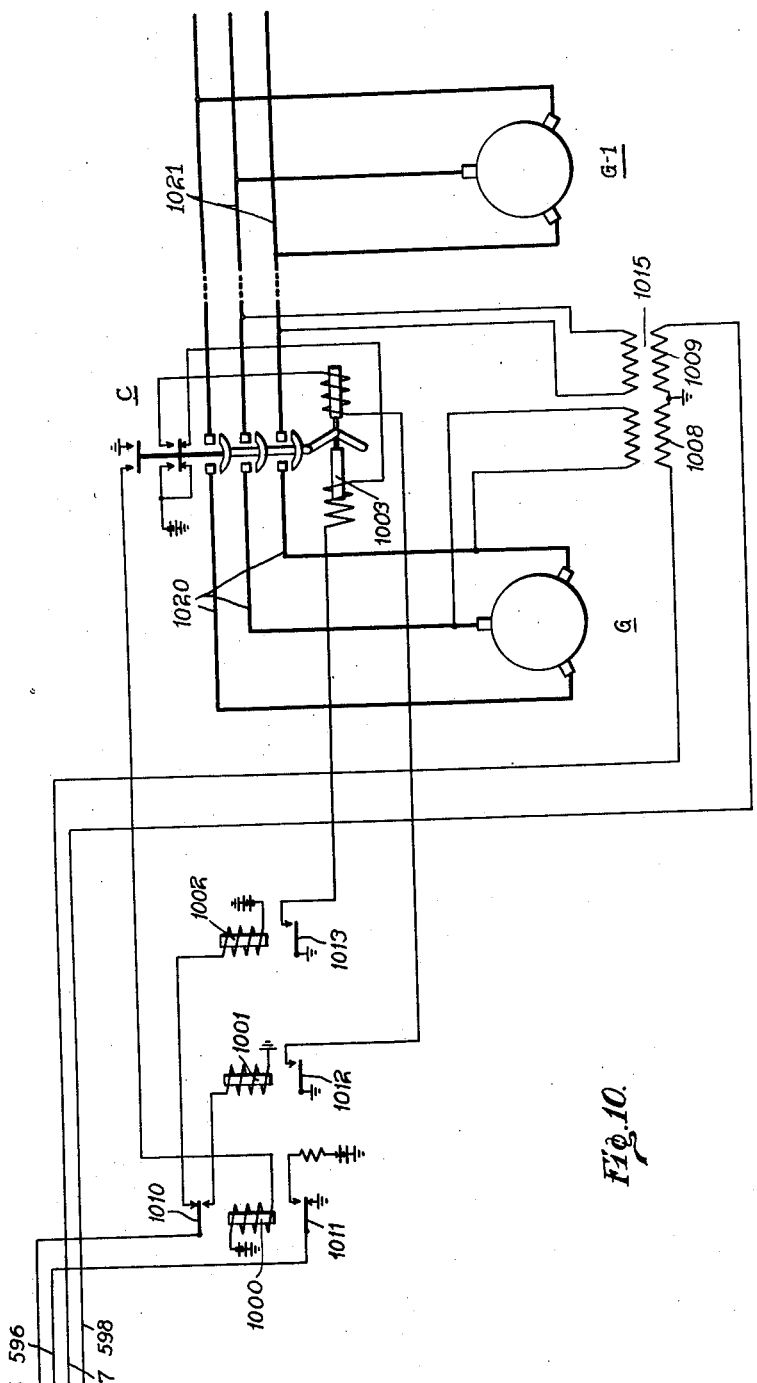

In Fig. 10, relays 1000 to 1002, inclusive, are associated with a circuit breaker C and are provided for the purpose of controlling its operation, as well as controlling the sending of supervisory signals, indicative of the operation of the circuit breaker C, to the dispatcher's office. Two dynamo-electric machines G and G-1 supply three-phase alternating current to feeders 1021 and 1020. These feeders are adapted to be tied together by the operation of the circuit breaker C. The circuit breaker C may be of any ordinary well-known type. A transformer 1015 is provided for reducing the voltage supplied to the conductors 595 and 596 which, under certain conditions, extend to the synchronoscope at the dispatcher's office.

The apparatus shown in the drawings having been described in general, its detailed operation will now be described. For this purpose, it will be assumed that the dispatcher desires to ascertain the voltage in one phase of the feeder 890. To accomplish this result, the dispatcher must energize the relay 815. To select this particular phase in the feeder, the dispatcher will operate the stop key K-10 and will then operate the start key K-11.

In the normal condition of the apparatus, there is a circuit completed which extends from battery by way of back contact and armature 221, holding relay 210, back contact and armature 212, conductor 31, back contact and armature 438, trunk conductor 40, armature 619 and its back contact, conductor 675, armature 805 and its back contact and holding relay 801 to ground. The holding relays 210 and 801 are energized over the above circuit in series.

The relay 210, upon operating, completes a circuit for the relay 208 at armature 225, and at armature 226 completes a circuit for the relay 209. The relay 208 operates to remove ground from the conductor 27 at armature 222 and to open one point in the locking circuit of the relay 204 at armature 223. The relay 209 is energized to prepare one point in the circuit of the starting relay 206.

At the substation, the relay 801 operates to open one point in the circuit of the relay 800 at armature 808 and to complete a circuit for the relay 802 at armature 807. The relay 802 is energized to remove ground from conductor 674 at armature 809 and to open one point in the locking circuit of the relay 804 at armature 810.

When the key K-11 is depressed, a circuit is completed which extends from ground by way of working contact of the spring of said key and said spring, armature 224 and its front contact, back contact and armature 217, armature 220 and its back contact and relay 206 to battery. The relay 206 is energized to complete a circuit extending from ground by way of back contact and armature 215, armature 219 and its front contact, relay 207 and relay 206 to battery, and to complete a circuit at armature 218 for the relay 205. The relay 207 is short-circuited so long as the original energizing circuit of the relay 206 is maintained.

The operation of the relay 205 opens the original energizing circuit of the relay 206, thus removing the short-circuit from the relay 207 and permittng this relay to energize. The relay 207 operates to open one point in the original energizing circuit of the relay 206 at armature 220 and to open the circuit of the holding relays 218 and 801 at the dispatcher's office and substation, respectively, at armature 221.

The holding relay 210 is deenergized to complete a circuit for the relay 203 at armature 226, to open the circuit of the relay 209 at the front contact of this armature and to open the circuit of the relay 208 at armature 225. The relay 209 is deenergized to open one point in the starting circuit. The relay 208 is deenergized to prepare one point in the locking circuit of the relay 204 and to place ground upon the conductor 27.

The relay 203, upon operating, completes a circuit for the relay 211 at armature 213, and at armature 212 prepares a circuit for the line relay 413. The relay 211, upon operating, establishes a locking circuit for itself at armature 229, prepares a starting circuit at armature 228 and, at armature 227, completes a circuit extending from ground by way of front contact and said armature, conductor 30, armature 385 and its back contact and switching relay 310 to battery. The switching relay 310 is energized to associate the first group of selecting relays 300 to 309, inclusive, with the counting relays 101 to 124, inclusive. The locking circuit for the relay 229 extends from ground by way of armature 433 and its back contact, conductor 33, armature 229 and its front contact and relay 211 to battery.

At the substation, the relay 801, upon retracting its armatures, opens the circuit of the relay 802 at armature 807, and at armature 808 completes a circuit for the relay 800. The relay 802 is deenergized to prepare a locking circuit for the relay 804 at armature 810 and to place ground upon the conductor 674 at armature 809. The relay 800 is energized to complete a circuit for the relay 803 at armature 806 and to prepare a circuit for the line relay 614 at armature 805.

The relay 803 operates to establish a locking circuit for itself at armature 811 and to complete a circuit at armature 812 extending from ground by way of said armature and its front contact, conductor 666, armature 554 and its back contact and switching relay 517 to battery. The switching relay 517 is energized to connect the first group of selecting relays 500 to 509, inclusive, under the control of the counting relays 700 to 723, inclusive. The locking circuit of the relay 803 extends from ground by way of armature 627 and its back contact, conductor 676, armature 811 and its front contact and relay 803 to battery.

The control circuit including the line relays 413 and 614 is now completed over a path which extends from the positive pole of the battery B at the dispatcher's office, back contact and armature 452, line relay 413, back contact and armature 440, conductor 32, front contact and armature 212, conductor 31, back contact and armature 438, trunk conductor 40, armature 619 and its back contact, conductor 675, armature 805 and its front contact, conductor 677, armature 661 and its back contact, line relay 614, armature 651 and its back contact, to the negative pole of the battery B-1 at the substation, and thence to ground. The line relays 413 and 614 are energized over this circuit.

The line relay 413, at the dispatcher's office, upon operating, completes a circuit for the relay 415 at armature 449, and at armature 448 completes a circuit for the relay 403. The relay 415 is energized to open one point in the circuit of the relays 411 and 412 at armature 453, and at armature 454 to complete a circuit which extends from ground by way of armature 171 and its back contact, conductor 29, armature 446 and its back contact, armature 454 and its front contact, relay 414 and relay 415 to battery. The relay 414 is not energized over this circuit so long as the original energizing circuit for the relay 415 is maintained.

The relay 403, upon operating, establishes a locking circuit for itself at armature 429 to ground upon grounded conductor 29, completes a circuit for the relay 406 at armature 430, opens one point in the locking circut of the relay 402 at armature 428 and completes an impulsing circuit at armature 427. The relay 406 is energized to complete a circuit which extends from battery by way of armature 436 and its front contact, back contact and armature 437, relay 408 and back contact and armature 461 to ground.

The previously mentioned impulsing circuit extends from ground by way of back contact and armature 450, front contact and armature 427, conductor 25, armature 145 and its back contact, counting relay 112, back contact and armature 148 and back contact and armature 172 to battery. The counting relay 112 is energized over the above circuit and operates to complete a circuit extending from ground by way of armature 169 and its back contact, armature 147 and its front contact, counting relay 111, counting relay 112, back contact and armature 148 and back contact and armature 172 to battery. This circuit is not effective so long as the original energizing circuit of the counting relay 112 is maintained.

The relay 408 operates to prepare a circuit for the relay 418 at armature 439, and at armature 438 opens the circuit of the line relay 413. The relay 413 is deenergized to open the original energizing circuit of the relay 415, thus removing the short-circuit from the relay 414 and permitting this relay to energize. The relay 414 operates to open another point in the circuit of the relay 413 at armature 452, to open another point in the original energizing circuit of the relay 415 at armature 451, and to remove the short-circuit from the winding of the counting relay 111 at armature 450.

The counting relay 111 is energized to open another point in the original energizing circuit of the relay 112 at armature 145, to prepare a circuit for the counting relay 124 at armature 144 and to complete a circuit extending from ground by way of armature 169 and its back contact, armature 167 and its back contact, armature 146 and its front contact, conductor 21, spring 364 and its working contact and selecting relay 309 to battery.

The selecting relay 309 is energized over the above circuit and operates to prepare a circuit for the relay 417 at spring 353, to complete a circuit for the signalling lamp 327 at spring 354 and to prepare a signalling circuit at spring 352. The operation of the signalling lamp 327 apprises the dispatcher of the energization of the selecting relay 309.

At the substation, the line relay 614, upon operating, completes a circuit for the relay 612 at armature 653, and at armature 652 completes a circuit for the relay 605. The relay 612 is energized to open one point in the circuit of the relays 615 and 616 at armature 647, and to complete a circuit at armature 648 for the relay 613 which extends from ground by way of armature 764 and its back contact, conductor 678, armature 654 and its back contact, armature 648 and its front contact, relay 613, and relay 612 to battery. The relay 613 is not energized over the above circuit so long as the original energizing circuit of the relay 612 is maintained.

The relay 605 is operated to establish a locking circuit for itself at armature 630, to ground upon the grounded conductor 678, to complete a circuit for the relay 602 at armature 631, to open one point in the locking circuit of the relay 606 at armature 629 and to complete an impulsing circuit at armature 628. The relay 602 is energized to complete a circuit which extends from battery by way of armature 622 and its front contact, back contact and armature 621, relay 600 and back contact and armature 640 to ground.

The previously mentioned impulsing circuit extends from ground by way of back contact and armature 649, front contact and armature 628, conductor 672, armature 728 and its back contact, counting relay 700, back contact and armature 756 and back contact and armature 759 to battery. The counting relay 700 is energized to complete a circuit extending from ground by way of back contact and armature 762, armature 726 and its front contact, counting relay 701, counting relay 700, back contact and armature 756, and back contact and armature 759 to battery. The relay 701 is not energized so long as the original energizing circuit for the relay 700 is maintained.

The relay 600, upon operating, prepares one point in the circuit of the relay 609 at armature 620, and at armature 619 opens one point in the circuit of the line relay 614. The relay 614 is deenergized to remove the short-circuit from the relay 613. The relay 613 is energized to open another point in the circuit of the relay 614 at armature 651, to open one point in the original energizing circuit of the relay 612 at armature 650 and to remove the short-circuit from the counting relay 701 at armature 649.

The counting relay 701 is energized to open another point in the original energizing circuit of the relay 700 at armature 728, and to prepare a circuit for the counting relay 712 at armature 727, and to complete a circuit extending from ground by way of armature 762 and its back contact, armature 743 and its back contact, armature 729 and its front contact, conductor 581, spring 569 and its working contact and selecting relay 500 to battery.

The selecting relay 500 is energized to complete a circuit for the relay 815 at spring 518, to prepare a signalling circuit at spring 520 and to complete a circuit, at spring 519, which extends from ground by way of said spring and its working contact, conductor 671 and relay 611 to battery. The relay 611 is energized over the above circuit and operates to complete a circuit for the relay 608 at armature 644 and to complete a circuit for the relay 609 at armatures 645 and 646 over a path which extends from ground by way of front contact and armature 620, armature 646 and its front contact, back contact and armature 643, relay 609, armature 642 and its back contact and front contact and armature 645 to battery.

The relay 609 is energized to open the circuit of the relay 600 at armature 640 and to establish a locking circuit for itself at the front contact of this armature. The relay 608 is energized to complete a locking circuit for itself, at armature 638, to ground upon the grounded conductor 678, to open one point in the locking circuit of the relay 607 at armature 639 and to complete a circuit at the front contact of this armature for the relay 618. The relay 618 is energized to prepare a circuit for the line relay 617 at armature 661. The relay 600 is deenergized to prepare another point in the circuit of the line relay 617.

Inasmuch as the key K–1 at the dispatcher's office has been depressed, there is no circuit completed for the relay 416 and the relay 408 remains energized, thus maintaining the control circuit open. The functioning of the control circuit is now interrupted until other operations have been performed.

The circuit for the relay 815 extends from ground through the high-resistance winding of the common relay 565, working contact of spring 518 and said spring, conductor 588 and relay 815 to battery. By reason of the high-resistance of the relay 565, the relay 815 is not energized, although the former relay is energized. The relay 565 operates after a short interval by reason of its low resistance winding which is short-circuited by the armature 567.

The relay 565, upon operating, completes a circuit which extends from ground by way of resistor 568, armature 566 and its front contact, working contact of spring 518 and said spring, conductor 588 and relay 815 to battery. There is sufficient current over this circuit to energize the relay 815. However, the relay 565 is not completely short-circuited but maintains its armatures in attracted position. The relay 815 is energized to connect the secondary of the transformer 891 at armatures 819 and 820 to the metering device 818.

In accordance with the voltage across the selected phase of the predetermined feeder 890, the movable coils of the Kelvin balance are operated and the contact-making member 828 is forced into engagement with the contact member 829. As a result of this operation, a circuit is completed for the motor 835. The motor 835 is operated to rotate the contact arm 834 in a clockwise direction over the resistor 833.

In the meantime, there is a circuit completed which extends from battery by way of resistor 833, contact arm 834, armature 831 of the galvanometer 832, conductor 665, spring 520 and its working contact, trunk conductor 41, working contact of spring 352 and said spring, conductor 277 and voltmeter 255 to ground. The value of the current over this circuit is altered by the movement of the contact arm 834, the current increasing as the contact arm 834 moves in a clockwise direction.

As more current traverses the above circuit, more torque is exerted by armature 831 of the galvanometer 832. The torque exerted by the armature 831 tends to bring the movable coils of the Kelvin balance to their normal position. When there is sufficient current traversing this signalling circuit, the torque exerted by armature 831 will bring the movable coils of the Kelvin balance to their normal position with the consequent opening of the circuit of the motor 835. The contact-making member 834 is then in a certain definite position with regard to the resistor 833. This position is regulated by the voltage across the selected phase of the feeder 890.

As the current flow over the signalling circuit is controlled by the voltage, the voltmeter 255 is calibrated to indicate the correct reading of the electromotive force across the selected phase. Any change in voltage across this phase causes the movement of the contact arm 834 in one direction or the other, depending upon whether the voltage rises or falls with the consequent change in the current flow over the signalling circuit, including the voltmeter 255. The dispatcher is thus enabled to observe the condition of this phase of the feeder 890 so long as he desires.

After the dispatcher has noted the voltage of this phase, he may desire to ascertain the voltage of another phase of the feeder 890. In order to accomplish this result, the dispatcher will operate the key K-9 and will then release the key K-10. By the release of the key K-10, a circuit is completed extending from ground by way of resting contact of the key springs, working contact of springs 353 and said spring, conductor 35 and relay 417 to battery. The relay 417 is energized to complete a circuit for the relay 400 at armature 458 and to complete a circuit for the relay 418 at armatures 456 and 457 over a path extending from ground by way of front contact and armature 439, armature 457 and its back contact, front contact and armature 460, relay 418, armature 459 and its front contact and back contact and armature 456 to battery.

The relay 418 is energized over the above circuit and operates to open the circuit of the relay 408 at armature 461 and to close a locking circuit for itself at the front contact of this armature. The relay 400 is energized to complete a locking circuit for itself at armature 419 to ground upon grounded conductor 29, to open the locking circuit of the relay 401 at armature 420, and to complete a circuit for the relay 409. The relay 409 is energized to prepare a circuit for the line relay 410 at armature 440. When the relay 408 is denergized, the control circuit, including the line relays 410 and 617, is empleted.

The control circuit extends from the negative pole of the battery B at the dispatcher's office by way of back contact and armature 445, line relay 410, front contact and armature 440, conductor 32, front contact and armature 212, conductor 31, back contact and armature 438, trunk conductor 40, armature 619 and its back contact, conductor 675, armature 805 and its front contact, conductor 677, armature 661 and its front contact, line relay 617, armature 658 and its back contact, to the positive pole of the battery B-1 at the substation, and thence to ground. The line relays 410 and 617 are energized over the above circuit.

The line relay 410 operates to complete a circuit for the relay 412 at armature 442 and to complete a circuit for the relay 402 at armature 441. The relay 412 is energized to open the circuits of the relays 414 and 415 at armature 446 and to prepare a circuit for the relay 411. The relay 414 is deenergized to prepare one point in the circuit of the relay 415 at armature 451, and to prepare a point in the circuit of the relay 413 at armature 452. The relay 415 is deenergized to open one point in the circuit of the relay 414 at armature 454 and to complete a circuit, at armature 453, which extends from ground upon grounded conductor 29 by way of back contact and armature 453, armature 447 and its front contact, relay 411 and relay 412 to battery. This circuit is not effective so long as the original energizing circuit for the relay 412 is completed.

The relay 402 operates to open the locking circuit of the relay 403 at armature 424, to complete a circuit for the relay 407 at armature 425, and to prepare a locking circuit for itself at armature 423. The relay 403, upon being deenergized, opens the circuit of the relay 406 at armature 429, and at armature 428 establishes a locking circuit for the relay 402 to grounded conductor 29. The relay 406 is deenergized and the relay 407 is energized to prepare a circuit for the relay 408.

An impulsing circuit is also completed by the operation of the relay 402 which extends from ground by way of armature 443 and its back contact, armature 426 and its front contact, conductor 26, front contact and armature 144, armature 165 and its back contact, counting relay 124, back contact and armature 148 and back contact and armature 172 to battery.

The counting relay 124 is energized over the above circuit and operates to open the circuit of the selecting relay 309 at armature 167 and to complete a circuit, at the front contact of this armature, which extends from ground by way of back contact and armature 169, armature 167 and its front contact, counting relay 123, counting relay 124, back contact and armature 148 and back contact and armature 172 to battery. The counting relay 123 is not energized so long as the original energizing circuit for the counting relay 124 is maintained.

The selecting relay 309, upon being deenergized, opens one point in the signalling circuit at spring 352, opens the circuit of the signalling lamp 327 at spring 354, and at spring 353 removes ground from conductor 35, thereby opening the circuit of the relay 417. The relay 417 is deenergized to open the locking circuit of the relay 418. The relay 418 is energized to complete a circuit extending from ground by way of armature 461 and its front contact, relay 408, armature 437 and its front contact and back contact and armature 436 to battery.

The relay 408 is energized to prepare a circuit for the relay 418 at armature 439 and to open the circuit of the line relay 410 at armature 438. The line relay 410 is deenergized to permit the energization of the relay 411 by opening the original energizing circuit of the relay 412. The relay 411, upon operating, opens another point in the circuit of the line relay 410 at armature 445, opens another point in the original energizing circuit of the relay 412 at armature 444, and at armature 443 opens the original energizing circuit of the counting relay 124, whereupon the short-circuit is removed from the relay 123 and this relay is permitted to energize.

The relay 123 operates to prepare a circuit for the counting relay 110 at armature 164, to open another point in the original energizing circuit of the counting relay 124 at armature 165 and to complete a circuit extending from ground by way of armature 169 and its back contact, armature 143 and its back contact, armature 166 and its front contact, conductor 20, spring 363 and its working contact and selecting relay 308 to battery. The selecting relay 308 is energized to prepare a signalling circuit at spring 349, to prepare a circuit for the relay 416 at spring 350 and to complete a circuit for the signalling lamp 326 at spring 351. The lighting of the signalling lamp 326 apprises the dispatcher of the selection of the phase in the feeder 890 that he desires. The relay 417 is not energized by reason of the fact that the key K-9 has been previously depressed by the dispatcher, inasmuch as he desires to ascertain the voltage across the feeder 890.

At the substation, the line relay 617 is energized to complete a circuit for the relay 615 at armature 660 and to complete a circuit for the relay 606 at armature 659. The relay 615 operates to open the circuit of the relays 612 and 613 at armature 654 and to prepare a circuit for the relay 616 at armature 655. The relay 613 is deenergized to prepare one point in the circuit of the relay 612 at armature 651, and to prepare one point in the circuit of the line relay 614 at armature 651.

The relay 612 is deenergized to open another point in the circuit of the relay 613 at armature 648 and to complete a circuit which extends from ground upon grounded conductor 678 by way of back contact and armature 647, armature 655 and its front contact, relay 616 and relay 615 to battery. The relay 616 is not energized over this circuit by reason of the fact that it is short-circuited so long as the original energizing circuit of the relay 615 is maintained.

The relay 606 operates to prepare a point in its locking circuit at armature 632, to open the locking circuit of the relay 605 at armature 633 and to complete an impulsing circuit at armature 635. The relay 605 is deenergized to complete a locking circuit for the relay 606 at armature 629 and to open the circuit of the relay 602 at armature 630. The relay 602 is deenergized and the relay 601 is energized to prepare a point in the circuit of the relay 600.

The previously mentioned impulsing circuit extends from ground by way of back contact and armature 656, armature 635 and its front contact, conductor 673, front contact and armature 727, armature 745 and its back contact, counting relay 712, back contact and armature 756 and back contact and armature 759 to battery.

The counting relay 712 is energized over the above circuit and operates to open the circuit of the selecting relay 500 at armature 743 and to complete a circuit, at the front contact of this armature, over a path which extends from ground by way of armature 762 and its back contact, armature 743 and its front contact, relay 713, relay 712, back contact and armature 756 and back contact and armature 759 to battery. The relay 713 is not energized over the above circuit so long as the original energizing circuit of the relay 712 is maintained.

The selecting relay 500 is deenergized to open the circuits of the relays 565 and 815 at spring 518, to open one point in the signalling circuit at spring 520 and to remove ground from the conductor 671 at spring 519. The relay 565 is deenergized to restore certain circuits to normal. The relay 815 is deenergized to disconnect the secondary of the step-down transformer 891 from the metering device 818. The metering device is, consequently, maintained in the position to which it has been previously operated.

The removal of ground from conductor 671 brings about the deenergization of the relay 611. The relay 611, upon retracting its armatures, opens the locking circuit of the relay 609 at armatures 645 and 646. The relay 609 is deenergized to complete the circuit of the relay 600 over a path which extends from ground by way of armature 640 and its back contact, relay 600, armature 621 and its back contact and front contact and armature 622 to battery.

The relay 600 is energized to prepare a point in the circuit of the relay 609 at armature 620 and to open the circuit of the line relay 617 at armature 619. The relay 617 is deenergized, thereby removing the short-circuit from the relay 616. The relay 616 is operated to open another point in the circuit of the line relay 617 at armature 658, to open one point in the circuit of the relay 615 at armature 657 and to remove the short-circuit from the counting relay 713 at armature 656. The counting relay 713 is energized to prepare a point in the circuit of the counting relay 702 at armature 744, to open another point in the original energizing circuit of the relay 712 at armature 745, and to complete a circuit at armature 746 which extends from ground by way of armature 762 and its back contact, armature 730 and its back contact, armature 746 and its front contact, conductor 580, spring 570 and its working contact and selecting relay 501 to battery.

The selecting relay 501 is energized to prepare a signalling circuit at spring 522, to complete a circuit for the relays 565 and 816 in series at spring 521, and to place ground upon the conductor 670 at spring 561. The grounding of conductor 670 brings about the energization of the relay 610. The relay 610 is operated to complete a circuit for the relay 607 at armature 641, and to complete a circuit for the relay 609 at armatures 642 and 643. The relay 609 is energized to open the circuit of the relay 600 at armature 640 and to establish a locking circuit for itself at the front contact of this armature. The relay 607 is energized to open the locking circuit of the relay 608 at armature 636 and to prepare a point in its locking circuit at armature 637. The relay 608 is deenergized to complete the locking circuit of the relay 607 and to open the circuit of the relay 618. The relay 618 is deenergized to prepare a point in the circuit of the line relay 614. The relay 600 is deenergized to prepare another point in the control circuit at armature 619.

The common relay 565 is now energized over a path which extends from ground through its upper high-resistance winding, working contact of spring 521 and said spring, conductor 587 and relay 816 to battery. The relay 565 is energized after a short interval of time to bring about the energization of the relay 816.

The relay 816 is energized to connect the secondary of the step-down voltage transformer 821 to the metering device 818. The metering device 818 is now operated in accordance with the voltage in the phase selected.

A signalling circuit is now completed over a path which extends from battery by way of resistor 833, contact arm 834, armature 831 of the galvanometer 832, conductor 665, spring 522 and its working contact, trunk conductor 41, working contact of spring 349 and said spring, conductor 277 and voltmeter 255 to ground. The voltmeter 255 is actuated to indicate the voltage in the phase that has been selected by the operation of the selecting apparatus. The operation of the voltmeter 255 is controlled by the current flow from the circuit which is responsive to the adjustment of the contact arm 834 that is, in turn, controlled by the movement of the Kelvin balance.

The dispatcher having observed the voltage on this phase, he may desire to ascertain the resultant voltage on the three phases of the feeder 890. To accomplish this result, the operator will operate the key K–8 and will then release the key K-9. By the release of the key K-9, a circuit is completed which extends from ground by way of the normally closed springs of this key, resting contact of spring 350 and said spring, conductor 36 and relay 416 to battery.

The relay 416 is energized to complete a circuit for the relay 401 at armature 455 and to complete a circuit, at armatures 456 and 457, for the relay 418 over a path which extends from ground by way of front contact and armature 439, armature 457 and its front contact, back contact and armature 460, relay 418, armature 459 and its back contact and front contact and armature 456 to battery. The relay 418 is operated to open the circuit of the relay 408 at armature 461 and to establish a locking circuit for itself at the front contact of this armature.

The relay 401 is operated to open the locking circuit of the relay 400 at armature 421 and to prepare a locking circuit for itself at armature 422. The relay 400 is deenergized to open the circuit of the relay 409 and to complete a locking circuit for the relay 401. The relay 409 is deenergized to prepare a point in the circuit of the line relay 413. The relay 408, upon being deenergized, completes the control circuit which includes the line relays 413 and 614.

The functioning of the control circuit finally brings about the energization of the selecting relay 307 at the dispatcher's office, whereby a signalling circuit is prepared at spring 346, a circuit is prepared for the relay 417 at spring 347 and the signalling lamp 325 is lighted at spring 348. The lighting of the signalling lamp 325 apprises the dispatcher of the selection of the circuit that will give him the resultant voltage in the three phases of the feeder 890.

The relay 408, at the dispatcher's office, is, of course, energized to maintain the control circuit open until the dispatcher desires to have the control circuit function again.

At the substation, the operation of the control circuit brings about the energization of the relay 502. The relay 502 operates to complete a circuit for the relay 817 at spring 523, to place ground upon the conductor 671 at spring 562 and to prepare a signalling circuit at spring 524. The grounding of conductor 671 brings about the operation of the relays 611, 608 and 609. The relay 608 brings about the release of the relay 607 and the energization of the relay 618. The relay 618 operates to prepare a circuit for the line relay 617. The relay 609 is operated to open the circuit of the relay 600. The relay 600 is deenergized to prepare a point in the control circuit.

The relay 565 is operated over a circuit which extends from ground through its upper high-resistance winding, working contact of spring 523 and said spring, conductor 586, and relay 817 to battery. The relay 817 is operated to connect the voltage transformer 824 to the metering device 818. By the operation of the relay 817, the metering device 818 is connected across the three phases of feeders 890 so as to give the resultant voltage of the three phases as is evident from the drawing. As is clear from the drawing, the metering device 818 may also be connected over the armatures 822 and 823 of the relay 816 to measure the voltage across one phase of the system and may be connected over the armatures 819 and 820 of the relay 815 to measure the voltage in another phase of the system. That is, the same metering device may be switched to different circuit connections for reading characteristics of different circuits. The signalling circuit for the voltmeter 255 at the dispatcher's office is completed in substantially the same manner as before. The Kelvin-balance method of voltage measurement is fully explained in the Standard Handbook for Electrical Engineers (McGraw-Hill Co.) page 129, section 3, subsection 67. By the operation of the metering device, the voltmeter 255 is operated so as to indicate to the dispatcher the voltage in the three phases of the feeder 890. The operation of the metering device and associated apparatus is substantially the same as before.

After the dispatcher has observed the voltage on this feeder, he may desire to ascertain the current in one phase of the feeder 890. To accomplish this result, the dispatcher will operate the key K-7 and release the key K-8. By the release of the key K-8, ground is placed upon the conductor 35 and the relay 417 is energized. The relay 417 operates to complete a circuit for the relay 400 and also for the relay 418. The relay 400 is energized to complete a circuit for the relay 409 and to bring about the release of the relay 401. The relay 401 is deenergized to establish a locking circuit for the relay 400. The relay 418 operates to open the circuit of the relay 408, thus permitting this relay to be deenergized. The relay 408 is deenergized to reestablish the control circuit which includes the line relays 410 and 617.

The control circuit now functions in the usual manner to bring about the release of the selecting relays 307 and 502 and the energization of the selecting relays 306 and 503 at the dispatcher's office and substation, respectively. The operation of the relay 306 prepares a signalling circuit at spring 343, prepares a circuit for the relay 416 at spring 344 and completes a circuit for the signalling lamp 324 at spring 345. The signalling lamp 324 is operated to apprise the dispatcher that the selecting apparatus has functioned to select one phase of the feeder 890 in order to ascertain the current flow therein.

At the substation, the operation of the relay 503 completes a circuit for the relay 900 in series with the relay 565 at spring 525, places ground upon the conductor 670 at spring 563 and at spring 526 prepares a signalling circuit. The grounding of conductor 670 brings about the operation of the relay 610. The relay 610 is operated to cause the energization of the relays 609 and 607. The relay 607 is operated to open the circuit of the relay 608. The relay 608 is operated to open the circuit of the relay 618. The relay 609 is energized to open the circuit of the relay 600. The relay 600 retracts its armature to prepare a point in the control circuit. The relay 618 is deenergized to prepare one point in the circuit of the line relay 614.

The relay 900 is energized over a circuit which extends from ground through the upper high-resistance relay 565, working contact of spring 525 and said spring, conductor 585 and relay 900 to battery. The relay 565 is operated after a short interval of time to bring about the energization of the relay 900. The relay 900 is energized to connect the current transformer 912 to the metering device 906.

It will be noted that the resistor 913 is connected in shunt with the transformer 912. This connection is made in order to prevent excessive voltages being built up in the transformer windings, which would occur were there no path for the current when the relay 900 is deenergized.

The metering device 906 is now operated in accordance with the current traversing its windings to complete a circuit for the motor 940. A signalling circuit is also completed which extends from battery by way of resistor 942, contact arm 941, armature 948 of the galvanometer 949, conductor 680, spring 526 and its working contact, conductor 41, working contact of spring 343 and said spring, conductor 276 and ammeter 256 to ground. As the metering device 906 is operated, the contact arm 941 is rotated to a position with respect to the resistor 942 so that the current flow over the previously traced signalling circuit is directly proportional to the current in the phase of the feeder selected. The ammeter 256 thus indicates the current in this phase of the feeder.

In the event that the dispatcher now desires to ascertain the current flow in another phase of the feeder 890, he will operate the key K-6 and release the key K-7. The release of the key K-7 permits the control circuit to function so that the selecting relays 305 and 504 at the dispatcher's office and substation, respectively, are energized.

At the dispatcher's office, the relay 408 is, of course, energized as before to maintain the control circuit inoperative during the transmission of the meter indication. The operation of the relay 305 at the dispatcher's office prepares a signalling circuit at spring 340 and at spring 342 completes a circuit for the signalling lamp 323 which indicates to the dispatcher the functioning of the selective apparatus. The operation of the relay 504 at the substation brings about the energization of the relays 565 and 901 in series. The relay 901 is operated to connect the current transformer 914 to the metering device 906.

The metering device 906 is now operated in accordance with the current traversing this phase and the value of the current over the signalling circuit which extends from battery by way of resistor 942, contact arm 941, armature 948 of the galvanometer 949, conductor 680, spring 528 and its working contact, trunk conductor 41, working contact of spring 340 and said spring, conductor 276 and ammeter 256 to ground. The current traversing this circuit is dependent upon the current in the selected phase of the feeder 890. The dispatcher is also able to receive simultaneously two meter readings.

It will be assumed that the dispatcher desires to ascertain the current and voltage in one phase of the feeder 890. To accomplish this result, the dispatcher will operate the key K-5 and release the key K-6. By the release of the key K-6, the control circuit is again permitted to function and the selecting relays 304 and 505 at the dispatcher's office and substation, respectively, are energized. The operation of the control circuit is interrupted in the same manner as before.

By the operation of the selecting relay 505, the relay 565 is energized in series with the relays 902 and 903. The relay 902 is operated to connect the current transformer 918 to the metering device 906, while the relay 903 is operated to connect the voltage transformer 922 at armatures 923 and 924 to the metering device 818 over conductors 850 and 851. The metering device 906 is now operated whereby the contact arm 941 is rotated to a position which corresponds to the current in the selected phase. In a like manner, the metering device 818 is operated to cause the contact arm 834 to be rotated into position in contact with the resistor 833 that corresponds to the voltage in this phase of the feeder.

Two signalling circuits are completed, one of which extends from battery by way of resistor 942, contact arm 941, armature 948 of the galvanometer 949, conductor 680, spring 530 and its working contact, conductor 41, working contact of spring 336 and said spring, conductor 276 and ammeter 356 to ground. The other signalling circuit extends from battery by way of resistor 933, contact arm 834, armature 831 of the galvanometer 832, conductor 665, spring 531 and its working contact, conductor 42, working contact of spring 337 and said spring, conductor 277 and voltmeter 255 to ground.

The ammeter 256 is operated to indicate the current flow in the phase of the feeder selected. In the same manner, the voltmeter 255 is actuated to give the voltage in the phase of the feeder selected. In substantially the same manner as before, it is possible for the dispatcher to obtain any two readings simultaneously, as there are two signalling conductors extending between the dispatcher's office and station which may be used for transmitting indications.

The dispatcher may then desire to ascertain the power supplied by the feeder 890. To accomplish this result, the dispatcher will operate the key K–4 and will then release the key K–5. By the release of the key K–5, the operation of the control circuit is initiated and the selecting relays 303 and 506 at the dispatcher's office and substation, respectively, are energized in a manner similar to that before described. The operation of the control circuit is interrupted until the dispatcher restores the key K–4 to normal.

The relay 506 at the substation operates to bring about the energization of the relays 904 and 905. By the operation of the relay 904, the current transformers 925 and 926 are connected to the metering device 907 so that the meter is operated in response to the currents in the feeder. By the operation of the relay 905, the secondary of the voltage transformer 933 is connected to the movable coils of the metering device 907 so that the meter responds to the feeder voltage. By the joint connection, the meter is operated by the product of current and voltage of the feeder 890 or the power therein. By the operation of the metering device 907, the contact arm 957 is moved to the proper position with regard to resistor 956.

In the meantime, a signalling circuit is completed over a path which extends from battery by way of resistor 956, contact arm 954, armature 951 of galvanometer 950, conductor 681, spring 533 and its working contact, trunk conductor 41, working contact of spring 338 and said spring, conductor 275, and wattmeter 254 to ground. The current flow over this circuit is directly proportional to the power supplied by the feeder 890 and the wattmeter 254 is thus operated to indicate the power.

The dispatcher may now desire to connect two feeders, which are supplied by different generating machines, in order to take care of the load on the system. In order to do this, it is necessary for the dispatcher to know when the alternating voltages in the two feeders are in phase. In other words, the dynamo-electric machines supplying these feeders must be synchronized. To describe this operation, it will be assumed that the dispatcher desires to connect the feeders 1020 and 1021. In order to ascertain when the voltages generated by these machines are in phase, the dispatcher will operate the key K–3 and release the key K–4. As a result of the release of the key K–4, the control circuit starts to function and the selecting relays 302 and 507 at the dispatcher's office and substation, respectively, are energized. The relay 408 is, of course, operated to interrupt the functioning of the control circuit. By the operation of the relay 303, a signalling circuit is prepared, as well as circuits for certain relays in the control circuit.

At the substation, by the operation of the relay 507, a circuit is completed which extends from one terminal of the winding 1008 of the transformer 1015, conductor 597, spring 534 and its working contact, trunk conductor 41, working contact of spring 332 and said spring, conductor 273, and one winding of the synchronoscope 253 to ground. Another circuit extends from one terminal of the winding 1009 of the transformer 1015 by way of conductor 598, spring 541 and its working contact, trunk conductor 42, working contact of spring 335 and said spring, conductor 274 and through the synchronoscope 253 to ground. The synchronoscope 253 operates in the usual manner to indicate when the voltages in the feeders 1020 and 1021 are in phase.

It is desirable that the dispatcher operate the key K at substantially the same time that he operates the key K–3. By the operation of the key K, the springs 240 and 291 are forced into engagement with their working contacts and the springs 241 and 292 are forced from engagement with their resting contacts. The operation of the spring 241 removes ground from the conductor 271 extending to the key K–2. The operation of the spring 291 places ground upon the conductor 270 which extends to the spring 331 of the selecting relay 307.

Now, when the synchronoscope indicates that the two voltages are in synchronism, the dispatcher will release the key K–3. As a result of this operation, the control circuit instantly functions and the selecting relays 301 and 508 at the dispatcher's office and substation, respectively, are immediately energized. The operation of these relays prepares certain signalling circuits and causes the functioning of the control circuits in the usual manner.

The previously mentioned signalling circuit extends from ground by way of spring 291 of key K and its working contact, front contact and armature 243, conductor 270, spring 331 and its working contact, trunk conductor 41, working contact of spring 535 and said spring, conductor 595, armature 1010 and its back contact and relay 1002 to battery. The relay 1002 is energized to complete a circuit for the closing coil 1003 of the circuit breaker C. The circuit breaker C is operated to connect the feeders 1020 and 1021 together.

An additional result of the operation of the circuit breaker C is that a circuit is completed for the relay 1000. The relay 1000 is energized to open the circuit of the relay 1002 at armature 1010, to prepare a circuit for relay 1001 at the front contact of this armature, and to complete another signalling circuit which extends from battery by way of front contact and armature 1011, conductor 596, spring 536 and its working contact, trunk conductor 42, working contact of spring 338 and said spring, conductor 272, armature 244 and its back contact and relay 239 to ground.

The relay 239 is energized to attract the armature 252, thereby permitting the armatures 248, 249 and 250 on the relay 238 to be released. The operation of the armature 248 extinguishes the supervisory signalling lamp 247 and lights the supervisory signalling lamp 246. The operation of the armature 249 completes a circuit for the slow-release relay 237. The armature 250 opens one point in the circuit of the relay 235.

The relay 237 operates to open the circuit of the relay 239 at armature 244, to prepare a circuit for the relay 238 at the front contact of this armature and to complete a circuit extending from ground by way of spring 240 and its working contact, front contact and armature 245 and relay 236 to battery. The relay 236 is operated to attract its armature 251, thereby permitting the armatures 242 and 243 of the relay 235 to be released. By the release of the armature 242, ground is placed upon the conductor 271. By the operation of armature 243, the previously mentioned signalling circuit for the relay 1002 is opened. By the grounding of conductor 271, the operation of the control circuit is again initiated and the selecting relays 300 and 509 at the dispatcher's office and substation, respectively, are energized simultaneously.

In the present case, no signalling circuits are completed by the operation of the relays 300 and 509, as no circuits have been shown connected to these relays. In the event that the dispatcher desires to perform an operation that is selected by the operation of these selecting relays, the operations are the same as before described.

Eventually, however, the control circuit at the dispatcher's office causes the operation of the counting relays 102 and 101. By the operation of the relay 101, one point in the original energizing circuit of the relay 102 is opened at armature 130, a circuit is prepared for the counting relay 114 at armature 129, and at armature 131 a circuit is completed extending from ground by way of back contact and armature 169, armature 151 and its back contact, armature 131 and its front contact, conductor 11 and relay 313 to battery.

The relay 313 is operated to place ground upon the conductor 35 at armature 382 and to complete a circuit, at armature 381, which extends from ground by way of front contact and said armature, armature 383 and its back contact, relay 315, back contact and armature 388, conductor 38, and back contact and armature 434 to battery. The relay 315 is energized over the above circuit and operates to open the circuit of the switching relay 310 at armature 385 and to complete a circuit which extends from ground by way of armature 431 and its back contact, conductor 37, armature 386 and its front contact, relay 314, relay 315, back contact and armature 388, conductor 38 and back contact and armature 434 to battery. This circuit is not effective so long as the original energizing circuit for the relay 315 is maintained. The switching relay 310 is deenergized to disconnect the selecting relays 300 to 309, inclusive, from the control of the counting relays 101 to 124, inclusive.

By the connection of ground to conductor 35, the relay 417 is energized. The relay 417 operates to complete a circuit for the relay 400 at armature 458, and to complete a circuit for the relay 418 at armatures 459 and 460. The relay 418 operates to open the circuit of the relay 408 at armature 461, and to establish a locking circuit for itself at the front contact of this armature. The relay 400 is operated to open the locking circuit of the relay 401 at armature 420, to complete a circuit for the relay 409 at the front contact of this armature, and to complete a locking circuit for itself at armature 419. The relay 421 is deenergized to establish a locking circuit for the relay 400. The relay 409 is operated to prepare one point in the circuit of the relay 410. The relay 408 is deenergized to complete another point in the control circuit.

At the substation, by the functioning of the control circuit, the counting relays 710 and 711 are eventually operated. By the operation of the relay 711, a circuit is prepared for the counting relay 722 at armature 740, another point in the original energizing circuit of the relay 710 is opened at armature 741, and at armature 742 a circuit is completed extending from ground by way of armature 762 and its back contact, armature 755 and its back contact, armature 742 and its front contact, conductor 571 and relay 514 to battery. The relay 514 is energized to place ground upon conductor 671 at armature 539 and to complete a circuit, at armature 558, extending from ground by way of front contact and said armature, armature 556 and its back contact, relay 512, back contact and armature 553, conductor 668, and back contact and armature 623 to battery.

The relay 512 is energized over the above circuit and operates to open the circuit of the switching relay 517 at armature 554, and to complete a circuit extending from ground by way of armature 625 and its back contact, conductor 669, armature 555 and its front contact, relay 513, relay 512, back contact and armature 553, conductor 668 and back contact and armature 623 to battery. The relay 512 is not operated so long as the original energizing circuit for the relay 513 is maintained. The relay 517 is deenergized to disconnect the selecting relays 500 to 509, inclusive, from the control circuit of the counting relays 700 to 723, inclusive.

By the connection of ground to conductor 671, the relay 611 is energized. The relay 611, upon operating, completes a circuit for the relay 608 at armature 644, and at armatures 645 and 646 completes a circuit for the relay 609. The relay 609 is energized to open the circuit of the relay 600 at armature 640 and to establish a locking circuit for itself at the front contact of this armature. The relay 608 is energized to prepare a locking circuit for itself at armature 638, to open the locking circuit of the relay 607 at armature 639 and to complete a circuit for the relay 618 at the front contact of this armature. The relay 607 is deenergized to complete the locking circuit of the relay 608. The relay 618 is operated to prepare a circuit for the line relay 617. The relay 600 is deenergized to establish a control circuit.

The line relays 410 and 417 at the dispatcher's office and substation, respectively, are now energized in series. The relay 410 operates to complete a circuit for the relay 412 at armature 442 and to complete a circuit for the relay 402 at armature 441. The relay 412 operates to open the circuit of the relays 414 and 415 and to prepare a circuit for the relay 411. The relay 415 is deenergized to complete the circuit of the relay 411. The relay 414 is deenergized to restore certain circuits to normal. The relay 411 is not operated so long as the original energizing circuit of the relay 412 is closed.

The relay 402 operates to prepare a locking circuit for itself, to open the locking circuit of the relay 403 and to complete a circuit for the relay 407. The relay 403 is deenergized to complete the locking circuit of the relay 402 and to open the circuit of the relay 406. The relay 407 is energized and the relay 406 is deenergized to prepare a circuit for the relay 408.

Another result of the operation of the relay 402 is that a circuit is completed for the counting relay 114. The counting relay 114 operates to open the circuit of the relay 313 at armature 151 and to complete a circuit for the counting relay 113 at the front contact of this armature. The relay 113 is short-circuited as long as the original energizing circuit of the relay 114 is completed.

The relay 313, upon being deenergized, removes ground from the conductor 35 at armature 382, and at armature 381 removes the short-circuit from the relay 314. The relay 314 is operated to open one point in the original energizing circuit of the relay 315 at armature 383, to prepare a circuit for the relay 317 at the front contact of this armature, and to complete a circuit at armature 384 which extends from ground by way of back contact and armature 390, armature 384 and its front contact and switching relay 311 to battery. The switching relay 311 is energized to associate the second group of selecting relays with the relays of the counting chain.

The removal of ground from the conductor 35 causes the deenergization of the relay 417. As a result of the latter operation, the circuit of the relay 418 is opened and this relay is deenergized to complete a circuit for the relay 408. The relay 408 is operated to open the circuit of the relay 410. The relay 410 is energized to remove the short-circuit from the winding of the relay 411. The relay 411 is operated to remove the short-circuit from the counting relay 114. The relay 114 is operated to remove the short-circuit from the winding of the relay 126 which is energized in series with all the counting relays, to open one point in the original energizing circuit of the relay 114 at armature 149 and to complete a circuit at armature 150 which extends from ground by way of armature 168 and its back contact, armature 150 and its front contact, conductor 10 and relay 312 to battery.

The relay 312 is energized to complete a circuit for the relay 416 over the conductor 36. The relay 416 operates to complete the circuit of the relay 418 and also for the relay 401. The relay 401 is energized to open the circuit of the relay 400. The relay 400 is deenergized to open the circuit of the relay 409. The relay 409 is deenergized to prepare one point in the circuit of the relay 413.

The relay 126, upon operating, completes a circuit for the relay 125 at armature 173. The relay 125 is energized to establish a locking circuit for itself at armature 170, to remove ground from the conductor 29 at armature 171, to place ground upon the conductor 28 at armature 171, to open the circuit of the relay 312 at armature 168, and to open the circuit of the counting relays 101 to 124, inclusive, at armature 169.

The locking circuit of the relay 125 extends from ground by way of armature 222 and its back contact, conductor 27, armature 170 and its front contact and relay 125 to battery. The relays 101 to 124, inclusive, are, consequently, released, as is the relay 126.

The deenergization of the relay 312 removes ground from the conductor 36, thereby opening the circuit of the relay 416. The relay 416 is deenergized to open the locking circuit of the relay 418. The removal of ground from the conductor 29 brings about the deenergization of the relays 401, 411, 412 and 402. These relays are deenergized to restore certain circuits to normal. By the deenergization of the relay 402, the circuit of the relay 407 is opened and this relay is deenergized.

The connection of ground to conductor 28 causes the energization of the relay 204. The relay 204 operates to establish a locking circuit for itself at armature 214, to open the circuits of the relays 206 and 207 at armature 215, and to open the circuit of the relay 203 at armature 216. The relay 206 is deenergized to open the circuit of the relay 205 and also another point in the circuit of the relay 207. The relay 207 is deenergized to prepare a circuit for the relay 206 at armature 220, and to prepare a point in the circuit of the relay 210. The relay 205 is deenergized to prepare one point in the circuit of the relay 206. The relay 203 is deenergized to open the original energizing circuit of the relay 211 at armature 213 and to prepare another point in the circuit of the holding relay 210.

At the substation, the operation of the line relay 617 causes the energization of the relays 615 and 606. The relay 615 operates to open the circuit of the relays 612 and 613 and to prepare a circuit for the relay 616. The relay 613 is deenergized to prepare a point in the circuit of the relay 612. The relay 612 is deenergized to establish the circuit of the relay 616. The circuit for the relay 616 is not effective so long as the original energizing circuit for the relay 615 is maintained.

The relay 606 operates to complete a circuit for the relay 601, to open the locking circuit of the relay 605 and to prepare a locking circuit for itself. The relay 605 is deenergized to complete a locking circuit for the relay 606 and to open the circuit of the relay 602. The relay 601 is energized and the relay 602 is deenergized to prepare points in the circuit of the relay 600.

Another result of the operation of the relay 606 is that a circuit is completed for the counting relay 722. The relay 722 is operated to open the circuit of the relay 514 and to prepare a circuit for the relay 723. The relay 514 is deenergized to remove ground from conductor 671, thus opening the circuit of the relay 611. The relay 611 is deenergized to open the locking circuit of the relay 609. The relay 609 is deenergized to complete a circuit for the relay 600. The relay 600 is operated to open the circuit of the relay 617. The relay 617 retracts its armatures to remove the short-circuit from the relay 616. The relay 616 is operated to remove the short-circuit from the counting relay 723. The counting relay 723 is energized to remove the short-circuit from the relay 724 at armature 756, to open another point in the original energizing circuit for the relay 722 at armature 757 and to complete a circuit at armature 758 which extends from ground by way of armature 761 and its back contact, armature 758 and its front contact, conductor 570 and relay 515 to battery.

The relay 515 is energized to place ground upon the conductor 670, thereby completing a circuit for the relay 610. The relay 610 is energized to complete a circuit for the relay 607 at armature 641, and to complete a circuit for the relay 609 at armatures 642 and 643. The relay 609 is energized to open the circuit of the relay 600. The relay 607 is energized to open the locking circuit of the relay 608. The relay 608 retracts its armature to open the circuit of the relay 618. The relay 618 is deenergized to prepare a point in the circuit of the relay 614. The relay 600 is deenergized to complete one point in the holding circuit.

The relay 724 is energized in series with all the counting relays and operates to complete a circuit for the relay 725 at armature 760. The relay 725 is energized to establish a locking circuit for itself at armature 763, to remove ground from the conductor 678 at armature 764, to place ground upon conductor 685 at the front contact of this armature, to open the circuit of the relay 515 at armature 761 and to open the circuit of the relays 700 to 724, inclusive, at armature 762. The relays 700 to 724, inclusive, are now released to restore certain circuits to normal. The locking circuit of the relay 725 extends from ground by way of armature 809 and its back contact, conductor 674, armature 763 and its front contact and relay 725 to battery.

By the removal of ground from the conductor 678, the circuits of the relays 607, 606, 615 and 616 are opened and these relays are deenergized to restore certain circuits to normal. The deenergization of the relay 606 opens the circuit of the relay 601 and this relay retracts its armature.

The grounding of conductor 679 causes the energization of the relay 804. The relay 804 operates to establish a locking circuit for itself at armature 814 and to open the circuit of the relay 800 at armature 813. The relay 800 is deenergized to open the original energizing circuit of the relay 803 at armature 806 and to complete a holding circuit at armature 805. This holding circuit now extends from ground by way of holding relay 801, back contact and armature 805, conductor 675, back contact and armature 619, trunk conductor 40, armature 438 and its back contact, conductor 31, armature 212 and its back contact, holding relay 210 and armature 221 and its back contact to battery. The holding relays 210 and 801 are now energized in series.

The relay 210 operates to prepare a circuit for the relay 209 at armature 226, and to complete a circuit for the relay 208 at armature 225. The relay 208 is operated to open the locking circuit of the relay 204 at armature 223, and to open the locking circuit of the relay 125 at armature 222. The relay 125 is deenergized to restore certain circuits to normal. The relay 204 is deenergized to complete a circuit for the relay 209. The relay 209 is energized to complete a starting circuit over a path which extends from ground by way of front contact and armature 228, armature 224 and its front contact, back contact and armature 217, armature 220 and its back contact and relay 206 to battery.

At the substation, the relay 801, upon being energized, completes a circuit for the relay 802. The relay 802 operates to open the locking circuit of the relay 804.

At the dispatcher's office, the relay 206 is energized to complete a circuit for the relay 207 and for the relay 205. When the relay 205 is operated, the relay 207 attracts its armatures. As a result of the latter operation, the circuit of the holding relays 210 and 801 is opened and these relays are deenergized to initiate the operation of the control circuit in substantially the same manner as before.

The control circuit now functions to cause the operation of the counting relays at the dispatcher's office and the counting relays at the substation in their proper sequence. The selecting relays of the second selecting group are also energized in the proper sequence. By the operation of the selecting relays, any signalling operations are performed that the dispatcher may desire and that are accessible to this group of relays. All of these operations take place in the same manner as hereinbefore described.

Attention is called to the fact that the line relays 413 and 410 at the dispatcher's office are connected to the control circuit alternately and such alternate connection is necessary in order to bring about the proper operation of the apparatus. Unless the selecting relays operate in the proper sequence, under the control of the counting relays, the relays 417 and 416 are not energized alternately and the functioning of the control circuit is interrupted.

In like manner, at the substation, the line relays 614 and 617 must be connected to the control circuit alternately and the selecting relays must be energized in the proper sequence in order to bring about the operation of the relays 611 and 610 alternately. Unless this is done, the control circuit ceases to function.

At the dispatcher's office, by the operation of the control circuit, the counting relay 101 is finally operated. The counting relay 101 operates to prepare a circuit for the counting relay 114 and to bring about the energization of the relay 313. The relay 313 operates to complete a circuit which extends from ground by way of front contact and armature 381, armature 383 and its front contact, armature 387 and its back contact, relay 317, back contact and armature 388, conductor 38 and armature 434 and its back contact to battery.

The relay 317 is operated to open the circuit of the switching relay 311 at armature 390 and to complete a circuit, at armature 389, which extends from ground by way of armature 431 and its back contact, conductor 37, armature 389 and its front contact, relay 316, relay 317, back contact and armature 388, conductor 38, and back contact and armature 434 to battery. The relay 316 is not energized for the present.

Another result of the operation of the relay 313 is that a circuit is completed over conductor 35 for the relay 417. The relay 417 is energized to complete a circuit for the relay 400 and also for the relay 418. The relay 400 is energized to complete a circuit for the relay 409. The relay 409 operates to prepare a circuit for the relay 410. The relay 418 is energized to open the circuit of the relay 408. The relay 408 is deenergized to prepare one point in the control circuit.

At the substation, by the operation of the control circuit, the relay 711 is energized. The relay 711 operates to complete a circuit for the relay 514. The relay 514 attracts its armature to place ground, at armature 559, upon the conductor 671, while, at armature 558, to complete a circuit which extends from ground by way of front contact and said armature, armature 556, and its front contact, armature 552 and its back contact, relay 510, back contact and armature 553, conductor 668, and back contact and armature 623 to battery.

The relay 510 is energized to open the circuit of the switching relay 516 at armature 551, and to complete a circuit for the relay 511 which extends from ground by way of armature 625 and its back contact, conductor 669, armature 550 and its front contact, relay 511, relay 510, back contact and armature 553, conductor 668, and back contact and armature 623 to battery. The relay 511 is not energized until the original energizing circuit for the relay 510 is opened.

By the grounding of conductor 671, the relay 611 is operated to complete a circuit for the relay 608 and for the relay 609. The relay 608 operates to open the circuit of the relay 607 and to complete a circuit for the relay 618. The relay 618 is operated to prepare a circuit for the line relay 617. The relay 609 is energized to open the circuit of the relay 600. The relay 600 is deenergized to complete the control circuit.

The line relays 410 and 617 are now energized in series. The operation of the line relay 410 causes the operation of the relays 412 and 402. The relay 412 is operated to open the locking circuit of the relays 414 and 415. The relay 415 is deenergized to complete a circuit for the relay 411, which is not effective so long as the line relay 410 is energized. The relay 402 operates to complete a circuit for the relay 407 and to open the circuit of the relay 403. The relay 403 retracts its armatures, as does the relay 406. The relay 407 prepares a circuit for the relay 408.

Another result of the operation of the relay 402 is the completion of a circuit for the counting relay 114. The counting relay 114 is energized to complete a circuit for the relay 113 and to open the circuit of the relay 313. The relay 313 is deenergized to remove ground from the conductor 35 and to remove the short-circuit from the relay 316. The relay 316 is energized to remove the short-circuit from the winding of the relay 405. The relay 405 operates to complete a circuit for the relay 404. The relay 404 is energized to establish a locking circuit for itself at armature 432, to open the locking circuit of the relay 211 at armature 433 and to open the circuits of the relays 314 to 317, inclusive, and relay 405 at armature 431. The relays 314 to 317, inclusive, and relay 405 are deenergized to restore certain circuits to normal. The locking circuit for the relay 404 extends from ground by way of armature 222 and its back contact, conductor 27, armature 432 and its front contact and relay 404 to battery.

The removal of ground from conductor 35 causes the deenergization of the relay 417 with the resultant deenergization of the relay 418 and the operation of the relay 408. The latter relay is energized to bring about the deenergization of the relay 410. The relay 411 is thus operated to permit the operation of the counting relay 113. The counting relay 113 is energized to remove the short-circuit from the relay 126 and to complete a circuit for the relay 312. The relay 126 is energized in series with all the counting relays.

The relay 312 operates to complete a circuit over conductor 36 for the relay 416. The relay 416 is energized to bring about the operation of the relay 418. The relay 418 opens the circuit of the relay 408. Another result of the operation of the relay 416 is that a circuit is completed for the relay 401. The relays 400 and 409 are thus released.

By the operation of the relay 126, a circuit is completed for the relay 125. The relay 125 is energized to establish a locking circuit for itself at armature 170, to remove ground from the conductor 29 at armature 171, to place ground upon the conductor 28 at the front contact of this armature, to open the circuit of the relay 312 at armature 168, and to open the circuits of the relays 101 to 124, inclusive, and also of the relay 126 at armature 169. The relays 101 to 124, inclusive, retract their armatures to restore certain circuits to normal, as does the relay 126.

By the removal of ground from conductor 29, the circuits of the relays 401, 402, 411 and 412 are opened and these relays are deenergized to restore certain circuits to normal.

By the connection of ground to conductor 28, a circuit is completed for the relay 204. The relay 204 is energized to establish a locking circuit for itself at armature 214, to open the circuit of the relays 206 and 207 at armature 215 and to open the circuit of the relay 203 at armature 216. The relay 206 is deenergized to open the circuit of the relay 205. The relay 207 is deenergized to prepare one point in the circuit of the holding relay 210 and also to prepare a circuit for the relay 206. The relay 205 is deenergized to close another point in the circuit of the relay 206. The relay 203 is deenergized to prepare another point in the circuit of the relay 210.

At the substation, the line relay 617, upon being operated, completes circuits for the relays 615 and 606. The relay 615 is energized to bring about the deenergization of the relays 612 and 613. The relay 612 is deenergized to complete a circuit for the relay 616. This circuit is not effective until the line relay 617 is deenergized.

The relay 606 is operated to complete a circuit for the relay 601 and to open the circuit of the relay 605. The relay 605 is deenergized to open the circuit of the relay 602. The relay 601 operates to prepare a circuit for the relay 600. Another result of the operation of the relay 606 is that a circuit is completed for the counting relay 722. The counting relay 722 is energized to open the circuit of the relay 514.

When the relay 514 is deenergized, the short-circuit is removed from the relay 511 and this relay is operated to remove the short-circuit from the relay 603. The relay 603 is energized to complete a circuit for the relay 604 at armature 624. The relay 604 operates to establish a locking circuit for itself at armature 626, to open the locking circuit of the relay 803 at armature 627 and to open the circuits of the relays 510 to 513, inclusive, and the relay 603 at armature 625.

The relays 510 to 513, inclusive, and the relay 603 are deenergized with obvious results.

The relay 514 is also deenergized to remove ground from conductor 671, thereby opening the circuit of the relay 611. The relay 611 is deenergizd to open the circuit of the relay 609. The relay 609 is deenergized to complete a circuit for the relay 600. The relay 600 operates to open the circuit of the line relay 617. The relay 617 is deenergized to permit the operation of the relay 616. The relay 616 operates to open the impulsing circuit, thereby permitting the operation of the relay 723. The relay 723 is energized to remove the short-circuit from the winding of the relay 724 and to complete a circuit for the relay 515.

The relay 515 operates to complete a circuit for the relay 610. The relay 610 is energized to close the circuit of the relay 607 and also of the relay 609. The relay 609 is energized to open the circuit of the relay 600. The relay 607 operates to open the circuit of the relay 608 which retracts its armatures, thereby opening the circuit of the relay 618. The relay 618 is consequently deenergized. The relay 600 retracts its armature to restore one point in the trunk circuit.

The relay 724 is energized to complete a circuit for the relay 725 at armature 760. The relay 725 is operated to establish a locking circuit for itself at armature 763, to remove ground from the conductor 678 at armature 764, to place ground upon the conductor 685 at the front contact of this armature, to open the circuit of the relay 515 at armature 761 and to open the circuit of the relays 700 to 724, inclusive, at armature 762. The relays 700 to 724, inclusive, are consequently deenergized with obvious results.

By the removal of ground from conductor 678, the relays 607, 606, 615 and 616 are deenergized. The deenergization of the relay 606 brings about the release of the relay 601.

By the grounding of conductor 685, the relay 804 is energized. The relay 804 operates to establish a locking circuit for itself at armature 814 and to open the circuit of the relay 800 at armature 813. The relay 800 is deenergized to reestablish the holding circuit. The holding relays 210 and 801 are now energized in series over the holding circuit.

The relay 210 operates to complete a circuit for the relay 208 at armature 225 and to prepare a circuit for the relay 209 at armature 226. The relay 208 is energized to open the locking circuit of the relays 125 and 404 at armature 222 and to open the locking circuit of the relay 204 at armature 223. The relay 125 retracts its armatures to restore certain circuits to normal.

The relay 404 is deenergized to prepare certain circuits. The relay 204 retracts its armature to complete a circuit for the relay 209. The relay 209 is operated to prepare a circuit for the relay 206. All the apparatus at the dispatcher's office is now restored to its normal condition.

At the substation, the holding relay 801 is energized to complete a circuit for the relay 802. The relay 802 operates to open the circuit of the relay 725 and also the circuit of the relay 604 at armature 809, and at armature 810 to open the locking circuit of the relay 804. The relay 804 is deenergized to prepare a circuit for the relay 800. In this manner, all the apparatus at the substation is restored to normal.

There have been no circuits shown by which the functioning of an apparatus unit at the substation will cause the operation of the selecting apparatus. However, this arrangement has been disclosed in the copending application of Thomas U. White, Serial No. 699,670, filed March 17, 1924, supervisory control systems.

Our invention is not limited to the particular arrangement of the apparatus illustrated and described, but may be variously modified without departing from the spirit and scope thereof, as set forth in the appended claims.

We claim as our invention:

1. In a supervisory control system, a first station, a second station, a plurality of electric circuits at said second station, a first and a second signalling line connecting said stations, an apparatus unit for connecting said electric circuits, and synchronously operated selecting apparatus at said first and said second stations, said selecting apparatus being arranged at a predetermined position thereof to connect said signalling lines for transmitting indications of the phase characteristics of the currents in said circuits to said first station and for connecting one of said signalling lines to operate the apparatus unit at the succeeding position.

2. In a supervisory control system, a first station, a second station, a plurality of electric circuits at said second station, said circuits having impressed thereon alternating currents, synchronously operated selectors at said stations, means including a predetermined position of said selectors for indicating the phase characteristics of the currents in said circuits at said first station and means including the succeeding position of said selectors for connecting said circuits to each other from said first station.

3. In a supervisory control system, a first station, a second station, a selector at each station, a plurality of electric circuits at said second station, said circuits having impressed thereon alternating currents, selectors comprising synchronous chains of relays at said stations, means including a predetermined position of said selectors for indicating the phase characteristics of the currents in said circuits at said first station and means including the succeeding position of said selectors for connecting said circuits to each other from said first station.

4. In a supervisory control system, a first station, a second station, a plurality of electric circuits at said second station, said circuits having impressed thereon alternating currents, synchronously operated selectors at said stations, a plurality of apparatus units at said second station, means including said selectors for selectively operating said apparatus units from said first station, means including a predetermined position of said selectors for indicating the phase characteristics of the currents in said circuits at said first station and means including the succeeding position of said selectors for connecting said circuits to each other from said first station.

5. In a supervisory control system, a first station, a second station, apparatus units at said second station, signalling devices individual thereto at said first station, a first and a second signalling line connecting said stations, a plurality of circuits at said second station, said circuits having impressed thereon alternating currents, synchronously operating selectors at said first and said second stations, means including said selectors and said first signalling line for selectively operating said apparatus units from said first station, means including said second signalling line and said apparatus for operating said signalling devices responsive to the operation of said apparatus units, means including said selectors and said first and said second signalling lines for indicating the relative phase characteristics of said electric circuits at said first station and means including said selectors and said first signalling line for connecting said electric circuits to each other from said first station.

6. In a supervisory control system, a first station, a second station, apparatus units at said second station, signalling devices individual thereto at said first station, a first and a second signalling line connecting said stations, a plurality of circuits at said second station, said circuits having impressed thereon alternating currents, synchronously operating chains of relays at said first and said second stations, means including said chains of relays and said first signalling line for selectively operating said apparatus units from said first station, means including said second signalling line and said apparatus for operating said signalling device responsive to the operation of said apparatus units, means including said chains of relays and said first and said second signalling line for indicating the relative phase characteristics of said electric circuits at said first station and means including said chains of relays and said first signalling line for connecting said electric circuits to each other from said first station.

7. In a supervisory control system, a first station, a second station, apparatus units at said second station, signalling devices individual thereto at said first station, a first and a second signalling line connecting said stations, a plurality of circuits at said second station, said circuits having impressed thereon alternating currents, synchronously operating distributors at said first and said second stations, means including said distributors and said first signalling line for selectively operating said apparatus units from said first station, means including said second signalling line and said distributors for operating said signalling device responsive to the operation of said apparatus units, means including said distributors and said first and said second signaling line for indicating at said first station the relative phase characteristics of the currents in said electric circuits, and means including said distributors for connecting said electric circuits to each other from said first station.

8. In a supervisory control system, a first station, a second station, apparatus units at said second station, signalling devices individual thereto at said first station, a first and a second signalling line connecting said stations, a plurality of circuits at said second station, said circuits having impressed thereon alternating currents, synchronously operating selectors at said first and said second stations, means including said selectors and said first signalling line for selectively operating said apparatus units from said first station, means including said second signalling line and said selectors for operating said signalling device responsive to the operation of said apparatus units, means including said selectors and said first and said second signalling line for indicating the relative phase characteristics of the currents in said electric circuits at said first station, and means including said selectors connecting said electric circuits to each other when in phase from said first station.

9. In a supervisory control system, a first station, a second station, apparatus units at said second station, signalling devices individual thereto at said first station, a first and a second signalling line connecting said stations, a plurality of circuits at said second station, said circuits having impressed thereon alternating currents, synchronously operating chains of relays at said first and said second stations, means including said chains of relays and said first signalling line for selectively operating said apparatus units from said first station, means including said second signalling line and said chains of relays for operating said signalling device responsive to the operation of said apparatus units, means including said chains of relays and said first and said second signalling line for indicating the relative phase characteristics of the currents in said electric circuits at said first station, and means including said chains of relays for connecting said electric circuits to each other when in phase from said first station.

10. In a supervisory control system, a first staton, a second station, apparatus units at said second station, signalling devices individual thereto at said first station, a first and a second signalling line connecting said stations, a plurality of circuits at said second station, said circuits having impressed thereon alternating currents, synchronously operating distributors at said first and said second stations, means including said distributors and said first signalling line for selectively operating said apparatus units from said first station, means including said second signalling line and said distributors for operating said signalling device responsive to the operation of said apparatus units, means including said distributors and said first and said second signalling line for indicating the relative phase characteristics of the currents in said electric circuits at said first station, and means including said distributors for connecting said electric circuits to each other when in phase from said first station.

11. In a supervisory control system, a first station, a second station, a plurality of electric circuits at said second station, a metering device, synchronously operated chains of relays at said first and said second stations, means including said synchronously operated chains of relays for selectively connecting said metering device to one of said circuits from said first station, a metering device at said first station, means including said synchronously operated chains of relays for operating said metering device at said first station in accordance with the operation of said metering device at said second station.

12. In a supervisory-control system, a first station, a second station, a plurality of power circuits at said second station, a measuring device at said second station common to said circuits, a repeating device at said first station common to said power circuits, a selector-relay chain at each of said stations, each having a plurality of selecting positions, said second-station selector-relay chain having a selecting position for each of said power circuits, said first-station selector-relay chain having selecting positions for each of said power circuits, repeater and drive lines connecting said stations, means, including said drive line, for operating said selector-relay chains in synchronism to their successive selecting positions, a stop key individual to each of said selecting positions at said first station, an indicating device individual to each of said selecting positions at said first station, means responsive to the operation of a stop key individual to a selecting position for bringing said selectors to a stop at said position, means responsive to the movement of said selector-relay chains to each selecting position for operating the indicating devices whereby an indication is provided of the selecting position, means for normally maintaining said common measuring device at said second station disconnected from any one of said power circuits while the selector-relay chains are passing through the successive selecting positions, means rendered operative after the stopping of said selector-relay chains at any one of said selecting positions for connecting said measuring device to the circuit individual thereto, and means, including said repeater line, rendered operative after the connection of said measuring device to the circuit individual to said selecting position, for operating the repeating device at said first station in accordance with the indication of the measuring device.

13. In a supervisory-control system, a first station, a second station, a plurality of power circuits at said second station, a measuring device at said second station common to said circuits, a repeating device at said first station, a distributor at each of said stations, each having a plurality of selecting positions, said second-station distributor having a selecting position for each of said power circuits, said first-station distributor having selecting positions for each of said power circuits, repeater and drive lines connecting said stations, means, including said drive line, for operating said distributors in synchronism to the successive selecting positions, a stop key individual to each of said selecting positions at said first station, an indicating device individual to each of said selecting positions at said first station, means responsive to the operation of a stop key individual to a selecting position for bringing said selectors to a stop at said position, means responsive to the movement of said distributors to each selecting position for operating the indicating devices whereby indication is provided of the selecting position, means for normally maintaining said common measuring device at said second station disconnected from any one of said power circuits while the distributors are passing through the successive selecting positions, said means being operative after the stopping of said distributors at any one of said selecting positions for connecting said measuring device to the circuit individual thereto, and means, including said repeater line, rendered operative after the connection of said measuring device to the circuit individual to said selecting position, for operating the repeating device at said first station in accordance with the indication of the measuring device.

14. In a supervisory-control system, a first station, a second station, a plurality of power circuits at said second station, a measuring device at said second station that is common to said circuits, a repeating device at said first station, a distributor at each of said stations, each having a plurality of selecting positions, said second-station distributor having a selecting position for each of said power circuits, said first-station distributor having selecting positions for each of said power circuits, repeater and drive lines connecting said stations, means, including said drive line, for operating said distributors in synchronism to the successive selecting positions, a stop key individual to each of said selecting positions at said first station, an indicating device individual to each of said selecting positions at said first station, means responsive to the operation of a stop key individual to a selecting position for bringing said distributors to a stop at said position, means responsive to the movement of said distributors to each selecting position for operating the indicating devices whereby indication is provided of the selecting position, means for normally maintaining said common measuring device at said station non-operative to transmit the readings of said measuring device to said first station while said distributors are moving through the successive selecting positions, said means being operative after the stopping of said distributors at any one of said selecting positions for rendering said measuring device operative to transmit functions of the circuit individual to said selecting position, and means, including said repeater line, for operating the repeating device at said first station in accordance with the operations of the measuring device.

15. In a supervisory-control system, a first station, a second station, a plurality of power circuits at said second station, a measuring device at said second station common to said circuits, a repeating device at said first station, a distributor at each of said stations having a selecting position for each power circuit, means for operating said distributors in synchronism, for associating said measuring device with said power circuits successively, controlling means for maintaining said measuring device disconnected from said power circuits while said distributors are moving over the selecting positions, means including said distributors for selecting one of said power circuits, means for bringing said distributors to a stop at any selecting positions corresponding to the power circuits, said measuring-device controlling means being responsive to said stopping for connecting said measuring device to the selected power circuit and means, including said distributors, for operating said receiving device at said first station in accordance with the indications of the measuring device.

16. In a supervisory-control system, a first station, a second station, a repeating circuit connecting said stations, a plurality of power circuits at said second station, a measuring device at said second station common to said power circuits, a repeating device at said first station, a distributor at each of said stations, each having a plurality of selecting positions, said second-station distributor having a selecting position for each of said power circuits, said first-station distributor having a selecting position for each of said power circuits, means for operating said selectors in synchronism to their successive selecting positions, means for bringing said selectors to a stop at any selecting position, means for normally maintaining said common measuring device at said second station non-operative to transmit functions of any of said power circuits while the distributors are passing through their successive selecting positions, means for rendering said measuring device operative after the stopping of said distributors at any one of said selecting positions, and means, including said repeater circuit, controlled by said measuring device for operating the repeating device at said first station in accordance with the indications of the measuring device.

In testimony whereof, we have hereunto subscribed our names this 13th day of May, 1924.

ROY J. WENSLEY.
THOMAS U. WHITE.